(12) United States Patent
Heshmat

(10) Patent No.: US 9,404,529 B2
(45) Date of Patent: Aug. 2, 2016

(54) FOIL JOURNAL BEARING APPLICABLE TO HIGH SPEED MACHINING CENTER

(71) Applicant: Hooshang Heshmat, Niskayuna, NY (US)

(72) Inventor: Hooshang Heshmat, Niskayuna, NY (US)

(73) Assignee: Mohawk Innovative Technology, Inc., Albany, NY (US)

( * ) Notice: Subject to any disclaimer, the term of this patent is extended or adjusted under 35 U.S.C. 154(b) by 0 days.

(21) Appl. No.: 14/875,520

(22) Filed: Oct. 5, 2015

(65) Prior Publication Data

US 2016/0025130 A1 Jan. 28, 2016

Related U.S. Application Data

(60) Division of application No. 13/950,107, filed on Jul. 24, 2013, now Pat. No. 9,151,322, which is a division of application No. 13/441,807, filed on Apr. 6, 2012, now Pat. No. 8,801,290, which is a continuation of application No. PCT/US2010/051451, filed on Oct. 5, 2010.

(60) Provisional application No. 61/278,385, filed on Oct. 6, 2009.

(51) Int. Cl.
*F16C 17/04* (2006.01)
*F16C 17/02* (2006.01)
*F16C 33/10* (2006.01)

(52) U.S. Cl.
CPC ............. *F16C 17/024* (2013.01); *F16C 17/042* (2013.01); *F16C 33/108* (2013.01); *F16C 2226/36* (2013.01); *F16C 2226/70* (2013.01); *F16C 2322/39* (2013.01)

(58) Field of Classification Search
CPC ...................................................... F16C 17/024
See application file for complete search history.

(56) References Cited

U.S. PATENT DOCUMENTS

| | | | | | |
|---|---|---|---|---|---|
| 4,223,958 | A | * | 9/1980 | Gray | F16C 17/024 384/99 |
| 4,295,689 | A | * | 10/1981 | Licht | F16C 17/024 384/103 |
| 4,385,787 | A | * | 5/1983 | Reisenweber | F16C 17/024 384/114 |
| 4,699,523 | A | * | 10/1987 | Hagemeister | F16C 17/024 384/103 |
| 5,102,305 | A | * | 4/1992 | Bescoby | F01D 5/02 416/241 B |
| 5,714,818 | A | * | 2/1998 | Eakman | F16C 17/02 310/90.5 |
| 6,158,893 | A | * | 12/2000 | Heshmat | F16C 17/024 384/106 |
| 2002/0097927 | A1 | * | 7/2002 | Lee | F16C 17/024 384/103 |
| 2012/0027327 | A1 | * | 2/2012 | McAuliffe | F16C 17/024 384/114 |

* cited by examiner

*Primary Examiner* — Thomas R. Hannon
(74) *Attorney, Agent, or Firm* — James C. Simmons

(57) ABSTRACT

A foil journal bearing. A single foil engages an inner surface of and is mounted to the bearing housing. The single foil extends circumferentially of the inner surface and has a generally flat top foil portion and a bump foil portion which is disposed between the top foil portion and the inner surface of the housing. The bump foil portion comprises a plurality of circumferentially spaced ridges which engage the top foil portion and further comprises a plurality of generally flat portions between the ridges respectively and which engage the inner surface of the housing.

15 Claims, 13 Drawing Sheets

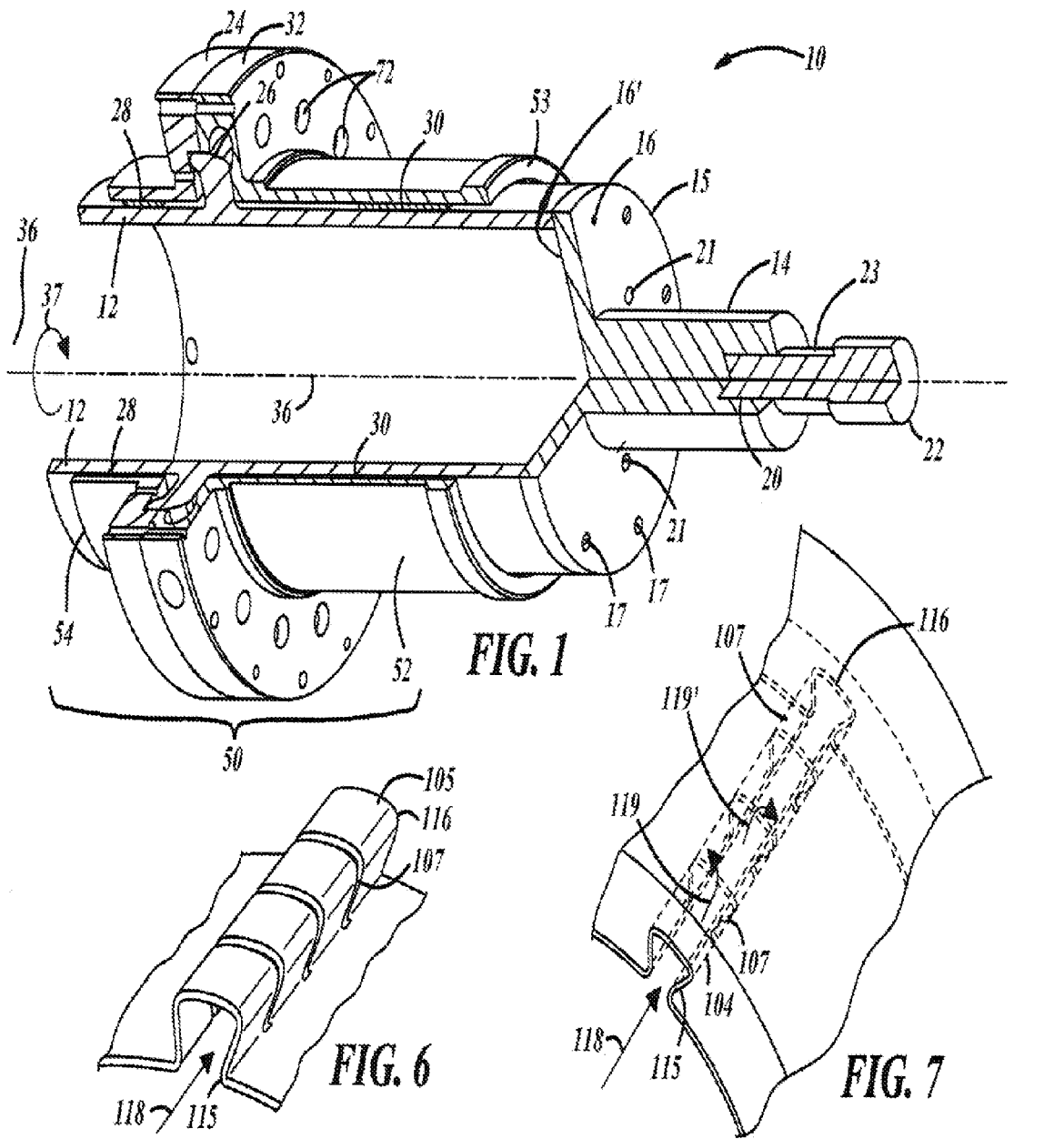

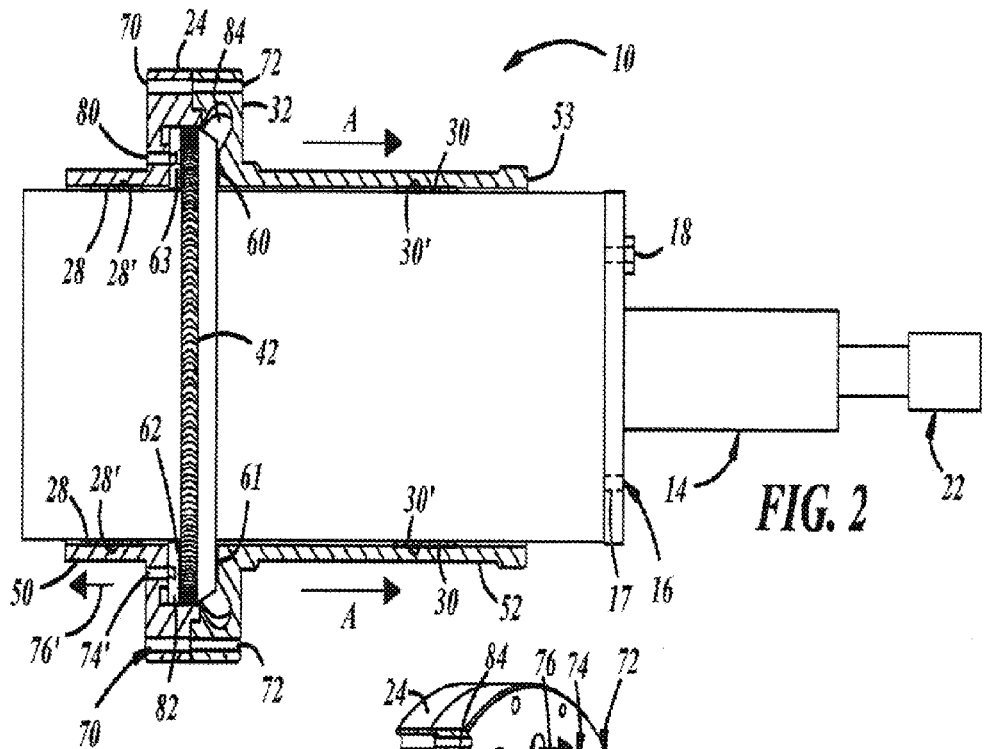
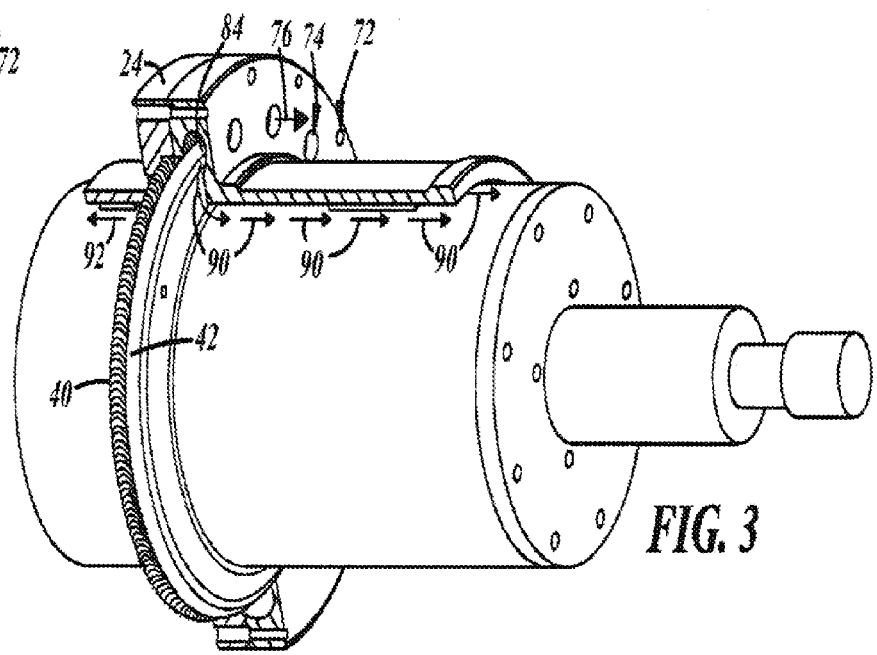

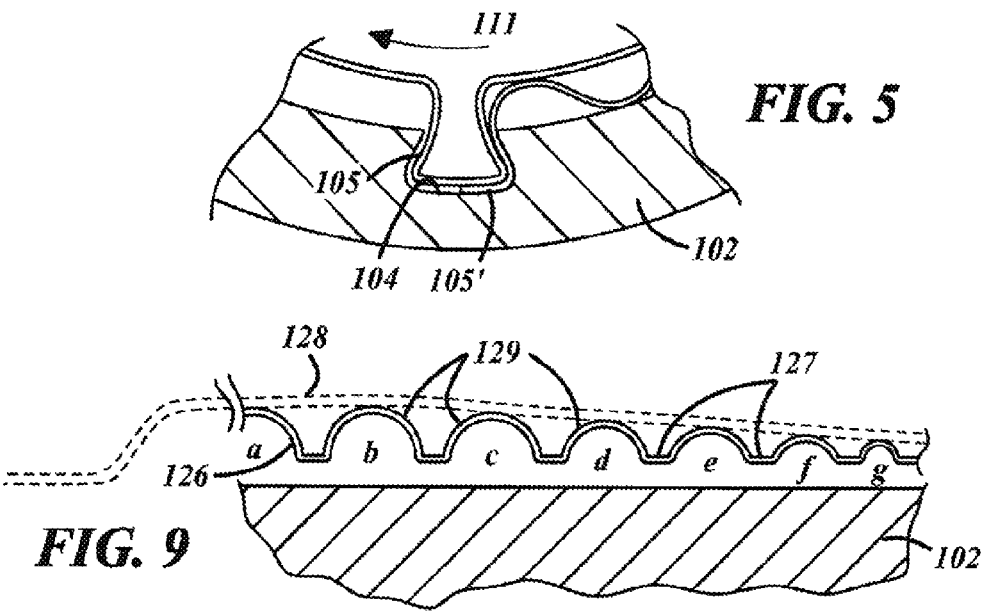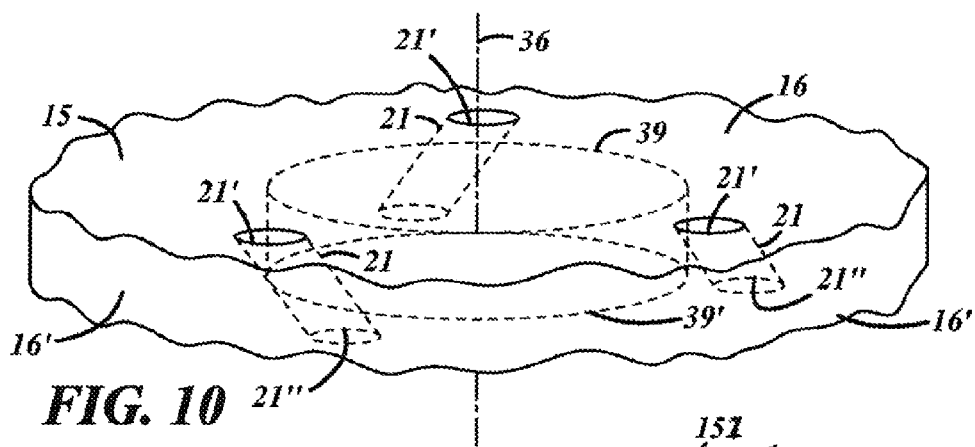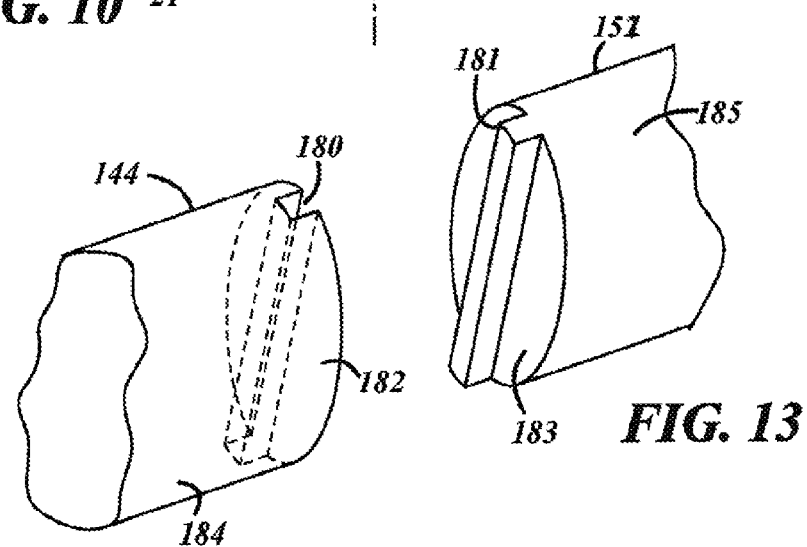

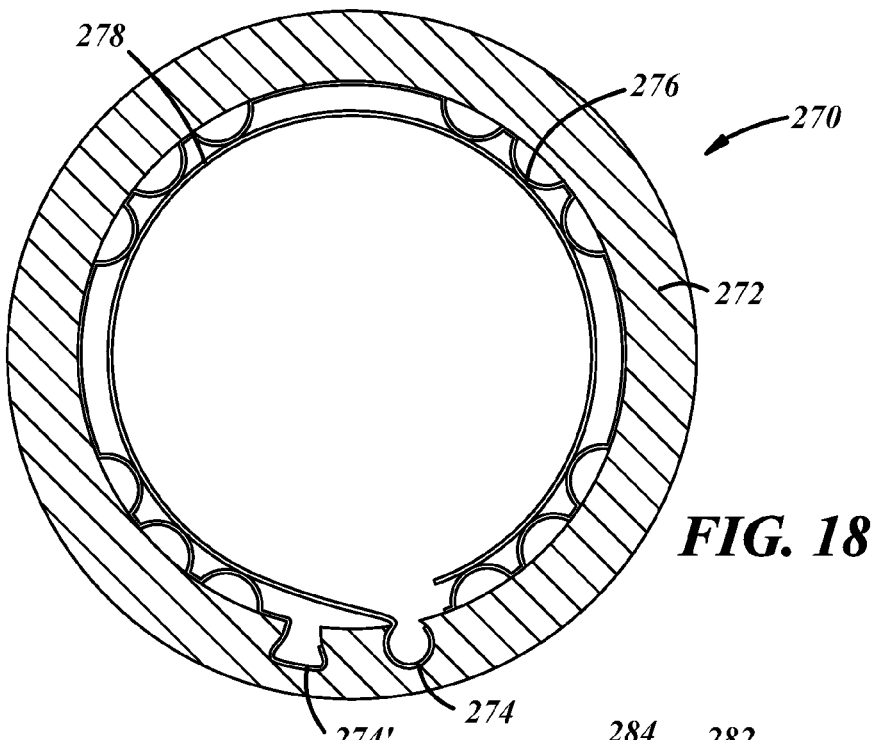
FIG. 18
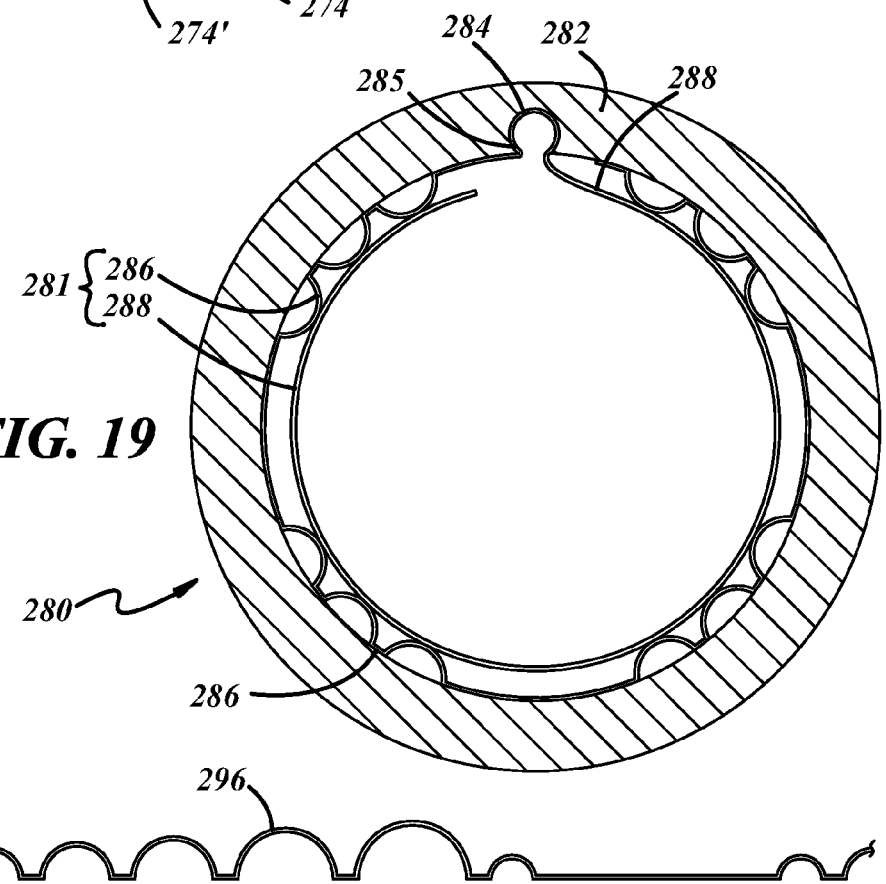
FIG. 19
FIG. 20

FOIL JOURNAL BEARING APPLICABLE TO HIGH SPEED MACHINING CENTER

This application is a divisional of application Ser. No. 13/950,107, filed Jul. 24, 2014 (issuing Oct. 6, 2015, as U.S. Pat. No. 9,151,322), which is a divisional of application Ser. No. 13/441,807, filed Apr. 6, 2012 (now U.S. Pat. No. 8,801,290), which is a continuation of international application PCT/US2010/051451, with an international filing date of Oct. 5, 2010, and which claims and it is hereby claimed the benefit of U.S. Provisional Application 61/278,385, filed Oct. 6, 2009. Each of these prior applications is hereby incorporated herein by reference.

TECHNICAL FIELD

The technical field relates to the development and application of high speed machining and grinding machines, particularly those suitable for fabrication of microscopic features, and of high speed foil journal and thrust bearings suited for use in such a micro-machine.

BACKGROUND

It is well known in the machining arts that cutting tools perform best when urged into contact with a workpiece at a specific speed or within a specific range of speeds. Although the particulars of the speed range may vary with workpiece composition or workpiece attributes such as hardness or ductility, this behavior is generally observed. In particular, it is observed in both metal and ceramic work-pieces, for tool steel, carbide, coated carbide, and ceramic tools, and for cutting tools of specified geometry such as milling cutters as well as for tools comprising a bonded assemblage of a more or less randomly-oriented cutting edges such as diamond or ceramic grinding tools.

Many rotating cutting tools, such as mills, burrs, and drills, mount the cutting edges at their periphery. Thus as the tool diameter is reduced to enable the creation of smaller features in the workpiece, commonly termed micro-machining, the tool is required to rotate faster to maintain the preferred peripheral cutting speed range since the linear velocity is given by the product of the angular velocity and the tool radius.

For purpose of illustration only, a reasonable value for the preferred cutting speed of aluminum is about 75 meters (about 246 feet) per minute. Thus, a rotary tool with a radius of about 500 micrometers (0.5 millimeter or about 0.02 inch) should be operated at a rotational speed of about 25000 revolutions per minute (rpm). Reducing the tool diameter to about 50 micrometers (about 0.002 inch) leads to a tool rotational speed of 250,000 rpm. With a still further reduction to about 25 micrometers (about 0.001 inch), it would necessitate a tool rotational speed of about 500,000 rpm for the cutting tool to operate in the preferred range.

Thus, micro-machines capable of micro-machining must, for robust cutting performance, operate at significantly higher rotational speeds than conventional machine tools. More specifically, for machined features 100 micrometers (about 0.004 inch) in width or less, the micro-machine should be capable of operation at several hundreds of thousands of rpm, which poses significant challenges in the manufacture and operation of such devices.

As the size of the machined feature shrinks, the need for high precision in the micro-machine increases. For example, control of tool run-out to micrometer levels is required, placing stringent requirements on tool-micro-machine attachment systems and on machine spindle alignment and run-out, among other issues. Since the machine spindle will be supported on bearings, many of the required micro-machine features promote a need for innovative bearing designs.

In turn, the machine spindle and bearings must be assembled into a support structure or housing. It may therefore be important that the housing, bearing, and spindle design be consistent with assembly practices which assure high precision in the assembled micro-machine. The assembly practices should be robust, that is, accepting of normal part or component tolerances and assembler skill level, without significant prejudice to performance. The assembly practices should also enable disassembly and reassembly without significant prejudice to performance.

SUMMARY

One embodiment may include a high speed micro-machine with a drive system for rotation of a spindle about a rotation axis and supported by at least one gas-cooled foil journal bearing and at least one gas cooled foil thrust bearing. The bearings in turn may be supported by a housing, with a pressurized gas reservoir. The housing may be split along at least one joint line into at least two parts. The housing may contain a pressurized gas reservoir. The joint line may lie in a plane substantially containing the axis of rotation or may lie in a plane substantially perpendicular to the axis of rotation. Both types of joint lines may be present simultaneously.

The micro-machine may be powered by a gas turbine or an electric motor or both, and, if powered by an electric motor, may incorporate a compressor for generation of pressurized gas for cooling the bearings. The drive system may be partitioned with a portion located on the spindle and a portion located on the housing.

The spindle may have a hollow portion bounded by an end-cap with inclined through holes for capture and retention of machining debris. Extending from the end-cap there may be a solid cylinder with, on its end, a tool holder for acceptance and retention of a tool shank.

The foil bearings, both thrust and journal, may be constructed of a number of top foil segments, supported by a like number of bump foil segments and mounted to and supported by a housing or support. The journal bearings may have the form of a hollow cylinder with the top foil and bump foil segments arranged around the interior surface; the thrust bearings may have the form of a disc-like thrust plate with bump foils and top foils mounted on one of the planar disc surfaces. The foil bearings, both thrust and journal, may be split and reassembled to facilitate assembly of the micro-machine. The foil bearings may be cooled by provision of pressurized gas flow directed along the channels in the housing. The gas flow may be directed along the cylindrical axis of the journal bearings, and radially inward, that is, from the edge of the generally disc-like thrust plate toward its center, for the thrust bearings.

In one embodiment, a foil journal bearing may include a plurality of top foils overlying a like number of bump foils, each supported by the interior circumference of a hollow, generally cylindrical, housing having a length. The widths of the top foils and bump foils may be substantially equal to the length of the housing. The bump foils may have a plurality of ridges and flats oriented generally parallel to the cylinder axis. Each of the top and bump foils may be attached to the housing. Attachment may be by engagement of mounting features on the foils which extend across substantially their width, with complementary features in the housing. The complementary features in the housing may be uniformly distributed around the interior circumference of the housing.

The mounting feature of a top foil may be located between the ends of the top foil to thereby divide the top foil into a leading segment and a trailing segment. The top foils may be arranged so that the leading segment of a first top foil overlies the trailing segment of an adjacent top foil. Each bump foil may have a length generally equal to the length of the leading segment and secured at a single location to underlie the leading segment of one of the top foils.

In a second embodiment, a foil journal bearing may include a top foil overlying a bump foil, each supported by the interior circumference of a hollow, generally cylindrical, housing having a length. The widths of the top foil and the bump foil may be substantially equal to the length of the housing. The bump foil may have a plurality of ridges and flats oriented generally parallel to the cylinder axis. The top foil and the bump foil may each have a length substantially equal to the interior circumference of the housing, and a width substantially equal to the length of the housing. Each of the top foil and bump foil may have a mounting feature extending substantially across its width for engagement with a feature of complementary shape in the housing. The bump foil may have a plurality of regions, each including groups of generally uniformly-spaced ridges and flats, the regions being separated by extended flat regions.

In a third embodiment, a foil journal bearing may include a single foil secured to and supported by a hollow, generally cylindrical, housing with a cylinder axis, an interior circumference, and a length. The width of the foil may be substantially equal to the length of the housing. The length of the foil may be substantially equal to twice the interior circumference of the housing, and the foil may have a mounting feature extending across its width. The engagement feature may engage a feature of complementary shape in the housing. The foil may have two portions of approximately equal length where one portion of the foil may be a bump foil having a plurality of regions each having groups of generally uniformly-spaced ridges and flats, the regions being separated by extended flat regions, and where the other portion of the foil may be a generally flat top foil which may overlie the bump foil which may overlie the interior of the housing. The mounting feature may be positioned at about the mid-length of the foil, or, alternatively, at the end of the bump foil portion of the foil.

One embodiment may include a foil thrust bearing comprising a plurality of generally planar top foils overlying a like number of coextensive bump foils, which may be supported by a generally disc-like thrust plate with a center and a circumference.

The top foils and their associated bump foils may be positioned in the annular region formed between two circles, an inner circle and an outer circle, where each circle may be centered on the thrust plate center. The foils may be bounded by four edges; on two opposing edges, the edges may have the form of circular arcs whose radii correspond to the radii of the inner and outer circle. The two other opposing edges are linear and may be portions of radial lines lying between the inner and outer circle. One of the linear ends of both the bump foil and thrust foil may be free and not secured to the thrust plate. One of the linear edges of the top foil and one of the linear edges of the bump foil may be secured to the thrust plate. The foils may be welded to the thrust plate or mechanically secured, for example, by means of a structure on the edge of the foil engaging a slot or other structure of complementary shape in the thrust plate. The foils may be generally equally spaced around the annular region and separated by gaps between adjacent foils.

Each of the bump foils may be divided into a series of circumferential tabs by a number of circumferentially-oriented slots extending from the free end of the foil part-way toward the secured end of the foil. Each of the tabs may be corrugated to form a series of substantially parallel ridges separated by flats, each of the ridges and flats being uniformly and substantially equally spaced apart and each of the ridges and flats being oriented generally parallel to the secured edge. Each of the ridges may be characterized by a peak with a height, with each of the flats having a centerline oriented generally parallel to the ridges.

The thrust plate may have a plurality of openings which permit the radial inflow of cooling gas to the bearing. The openings may be positioned on a circle with a radius greater than the radius of the outer circle. The openings may be positioned in the gaps between adjacent foils.

The peaks of the ridges in each of the bump foil tabs may be generally aligned and collinear. Alternatively, the peaks of the ridges in one tab may be aligned with the center-lines of the flats in adjacent tabs, or, equivalently, the center-lines of the flats in one tab may be aligned with the peaks of the ridges in adjacent tabs. The peaks of all of the plurality of ridges of the bump foil tabs may be of the same height or may be of differing heights.

The top foils may be coated with a hard lubricious layer to minimize wear during startup and shut down of a machine when the bearing runner will contact and rub against the top foil.

A second embodiment may incorporate all of the bump foils and all of the top foils in individual planar sheets, a bump foil sheet and a top foil sheet.

The bump foil sheet may be stamped and/or pierced to create a number of spaced-apart circumferentially-arranged bump foils, each with four edges and each of the bump foils being unsecured on three edges and continuous with the sheet on its fourth edge. The bump foils, as in the first embodiment, may have the general configuration of annular arcs with the foils disposed about a bump foil center.

The top foil sheet may be stamped and/or pierced to create a number of spaced-apart circumferentially-arranged top foils, coextensive with the bump foils, each with four edges and each of the top foils being unsecured on three edges and continuous with the sheet on its fourth edge. The top foils, as in the first embodiment, may have the general configuration of annular arcs, with the foils disposed about a top foil center.

The foil thrust bearing may then be assembled by assembling the bump foil sheet to the thrust plate and overlying the bump foil sheet with the top foil sheet, ensuring that the centers of the thrust plate, bump foil sheet, and top foil sheet coincide and that the top foils overlie the bump foils. The top foil and bump foil sheets may be attached to the thrust plate in any convenient fashion, but welding is preferred.

The details of the top foils and bump foils of the second embodiment may parallel those of the first embodiment. Also, a plurality of openings for ingress of cooling gas, similarly positioned as in those of the first embodiment, may be formed in at least the thrust plate and, if required, in the top foil and bump foil sheets.

The thrust bearings of both the first and second embodiments may be split along a line passing through the center of the thrust plate and passing through the gaps between the foils for bearing disassembly and reassembly. Guidance features may be incorporated into the thrust plate for ease of alignment during reassembly.

Other illustrative embodiments of the invention will become apparent form the detailed description provided hereinafter. It should be understood that the detailed description and specific examples, while disclosing embodiments of the invention, are intended for purposes of illustration only and are not intended to limit the scope of the invention.

BRIEF DESCRIPTION OF THE DRAWINGS

FIG. 1 shows in quarter cut-away perspective view a first embodiment of a micro-machine capable of high rotational speeds comprising a single piece hollow rotor with integral turbine wheel suitable for imparting rotation.

FIG. 2 shows the embodiment of FIG. 1 in cross-section to better illustrate the placement of the thrust and journal bearings and the manner in which air is bled from the turbine exhaust for bearing cooling.

FIG. 3 shows in partial cut-away perspective view the embodiment of FIG. 1 to better show some additional features, particularly flow paths for cooling air.

FIG. 5 shows further detail of attachment means for the bump foil and FIG. 6 shows further detail of attachment means for the top foil in the bearing of FIG. 4.

FIG. 7 shows the complementary top foil bearing shell attachment feature of the bearing of FIG. 4.

FIG. 9 shows a cross-sectional view of a portion of the foil thrust bearing of FIG. 8.

FIG. 10 shows a fragmentary detail of flange 15 of FIG. 1 to better illustrate features for capture and retention of machining debris.

FIG. 13 shows a fragmentary view of the abutting faces of two elements of an assembled rotor suitable for application in the second embodiment of the invention.

FIG. 18 shows a third embodiment of a foil journal bearing adapted to generate increased hydrodynamic pressure and a second embodiment of a cooperative foil bearing shell retainer groove geometry.

FIG. 19 shows a fourth embodiment of a foil journal bearing adapted to generate increased hydrodynamic pressure and a second embodiment of a cooperative foil bearing shell retainer groove geometry.

FIG. 20 shows a fragmentary view of an alternate embodiment of a bump foil.

DESCRIPTION OF PREFERRED EMBODIMENTS

FIG. 1 shows, in quarter cut-away perspective view, a first embodiment of a micro-machine 10, capable of high rotational speed and comprising a single piece hollow rotor with integral turbine wheel suitable for imparting rotation. In one embodiment, the components of the micro-machine may be constructed and arranged so that the micro-machining center is capable of high operating speeds of greater than 700,000 rpm, or greater than 1,000,000 rpm, or up to 1,500,000 rpm.

The micro-machine employs both journal foil bearings 28, 30 and thrust foil bearings 60, 62 (best seen at FIG. 2). Foil bearings support the shaft on a self-generated film of air, so that, at operating speeds, in either a journal or thrust bearing, there is no contact between the shaft and the bearing. Also, because of the low viscosity of the operating fluid (air or any operating process gas or liquid), frictional losses are lowered and temperature rise, though not insignificant, is inherently lower than most liquid lubricated bearings. Thus, issues of thermal expansion and its influence on shaft-bearing tolerances are reduced.

Figure 4:
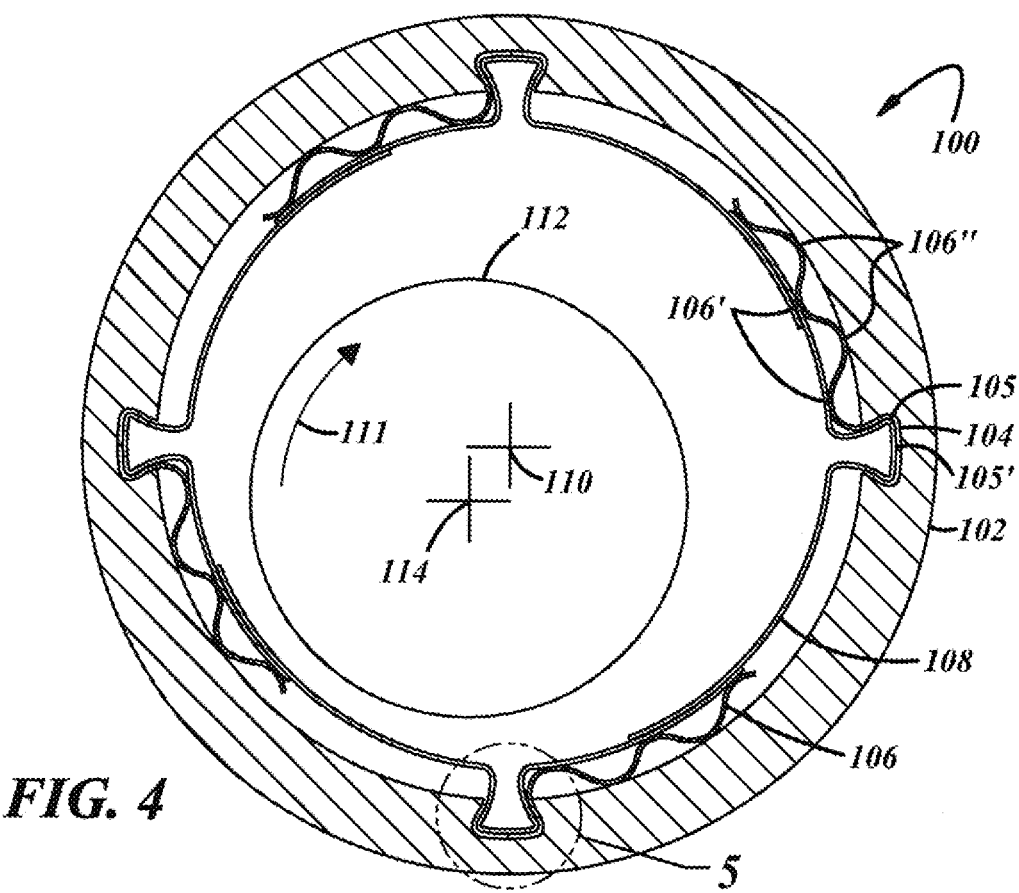
FIG. 4 shows a foil journal bearing adapted for receiving and distributing cooling air flow.

Foil bearings, for example, foil journal bearing 100 shown in FIG. 4, typically include three major elements: a smooth, thin top foil 108 which provides a smooth bearing surface; a corrugated compliant support foil or bump foil 106 which underlies the top foil and provides resilient support to the top foil; and a supporting shell 102 which positions and secures the foils.

As described in greater detail later, interaction between the top foil 108 and the rotating shaft 112 generates the air film which supports the shaft, while the corrugated compliant bump foil 106 contributes both stiffness and damping to the bearing. The pressure supporting the shaft load is conveyed by the air film to the smooth top foil 108, which deflects and elastically deforms the corrugations of the bump foil 106 and thereby imparts stiffness to the bearing. Also, the peaks 106' of the ridges of corrugated bump foil 106 are in contact with the underside of the top foil 108 while the valleys 106" of the bump foil are supported by the inner surface of bearing shell 102. The geometry of the corrugations assures that, as the corrugations are displaced vertically, they will simultaneously spread laterally. Hence, the peaks of the corrugations will rub against the underside of the top foil, and valleys of the corrugations will rub against the inner surface of the supporting shell. The friction associated with the rubbing of the foil will dissipate energy and impart damping to the bearing.

Bearing stiffness and damping is important in micro-machine applications because rotating machine tools such as mills, burrs, or drills generate complex, time-varying, three-dimensional loads even under invariant or steady-state cutting conditions. Cutting loads may also change abruptly, for example, when the tool enters or exits a cut. Thus, micro-machine bearings must be selected to provide sufficient stiffness and damping to accommodate both steady state and transient loads without generating an instability or excessive deflection.

Even with air as an operating fluid, operating speeds of up to 1,500,000 rpm may result in some increase in bearing temperature. Since foil bearings employ compliant elements, they may be made more tolerant of thermal expansion or of shaft-bearing misalignment than rolling contact bearings, but only at the expense of reduced bearing stiffness and damping. It may therefore be preferred to locate and position bearings to minimize bearing misalignment and to apply enhanced temperature management strategies to the bearings to minimize thermal effects.

The supporting air film is self-generated, resulting from the relative motion of the shaft and the bearing. The ability of the bearing to support the load imparted by the shaft depends on the relative motion of shaft and bearing and only after the shaft is rotating rapidly is the air film capable of fully supporting it. Hence, during periods of low shaft rotational speeds, for example, during start-up and shut-down, the shaft may contact, rub on, and wear the bearing surfaces, potentially limiting useful bearing life. The bearing surfaces, particularly the top foil surfaces which may contact the moving shaft, may therefore be coated with a wear-reducing surface coating. The coating may be both hard and lubricious. A suitable coating may be KOROLON (trademark) 1350 coating, a proprietary, spray-gun-applied, nickel-chrome coating with solid lubricants developed by MiTi, Albany, N.Y.

Referring to FIGS. 1 and 2, the micro-machine 10 may include a hollow rotor 12 connected to an extended overhung shaft 14 by means of flange 15, which has an outer surface 16 and an inner surface 16'. Flange 15 may be an integral part of rotor 12 with each machined from a common stock or may be attached to the front end of rotor 12 by suitable means, including welding, brazing and mechanical fasteners such as screws 18 (FIG. 2) which pass through holes 17 to engage threaded holes on rotor 12 (not shown). Shaft 14 is adapted to incorporate tool holder mechanism 20 for support and releasable retention of tool 22. Tool holder mechanism 20 may be received in a cylindrical cavity of precise dimension intended for shrink-fit retention of shank 23 of cutting tool 22.

The rotor 12 may include integral turbine wheel and thrust disc 42 (best seen at FIGS. 2 and 3) driven by a pressurized gas or gas mixture, including air, as a source of power. The pressurized gas may be introduced at nozzle ring 24, where, by means of guide-vanes 82 (indicated in FIG. 2), the flow is converted to supersonic jet-streams and then directed at a series of reaction turbine blades 40 (FIG. 3) mounted on turbine wheel/thrust disc 42 (FIG. 2).

Turbine wheel/thrust disc 42 has an axis of rotation 36 which is generally coaxial with the centerline of rotor 12. The thrust disc portion of turbine wheel/thrust disc 42 may preferably be coated with a wear resistant coating including, for example, thin, dense, tribological chromium alloys, titanium nitride, and others. The coating may be both hard and lubricious. As with the journal bearings, the proprietary nickel-chrome coating with solid lubricants, KOROLON (trademark) 1350 coating developed by MiTi, Albany, N.Y. may be suitable. The direction of rotation for the turbine blade configuration shown is indicated by arrow 37.

Rotor 12 may be supported by two foil journal bearings 28, 30, mounted inside machine 10 split housing 50, comprising first portion 52 and second portion 54, as shown best at FIG. 2. The foil journal bearings, which incorporate several novel features and will be described more fully later, may have very thin foil retaining shells (102, FIG. 4) comparable to the thickness of the smooth top foil (108, FIG. 4). Thin bearing shell 102 need not be a cylinder as shown in FIG. 4, but may instead be a wrapped foil in a quasi-cylinderical shape. After insertion of compliant elements, bump foil 106 and top foil 108, the complete journal bearing may be positioned, as bearings 28, 30 in split housing 50. An analogous construction, described in detail later, may be employed for the thrust bearings 60 and 62, arranged in opposition to accommodate axial loads applied to spindle 12.

The relative thickness and stack-up heights of the foil bearing compliant elements are extremely small relative to the thickness of split housing 50. The stack-up height may range from a few micrometers up to 1.25 mm (about 0.05 inch), while the wall thickness of the machines' bearing housing may range from a few mm up to 10 cm (3.9 inches) or more, depending on the size of the machine. The bearings shown have a thin (bearing) shell relative to the wall thickness of split shell 50. But it will be appreciated that with suitable adjustment to the geometry of split shell 50, in ways well know to those skilled in the art, thick shell bearings like those shown in FIG. 4 may also be employed.

The journal bearings may be positioned on either side of turbine wheel/thrust disc 42, that is, one bearing is positioned within the interior diameter of each of first and second portions 52 and 54 respectively of split housing 50. The bearings are suitably dimensioned to accommodate the outer diameter of hollow rotor 12.

Rotor 12 may be supported by a split housing 50 comprising a first portion 52 and a second portion 54. Portions 52 and 54 may be releasably attached, for example, with mechanical fasteners, along a common attachment plane generally positioned on the mid-plane of the turbine wheel/thrust disc 42.

Opposed thrust bearings 60 and 62 (for clarity shown only in FIG. 2) may be mounted in recessed openings 61 and 63 (FIG. 2) of housings 52 and 54, and, more particularly, within rings 24 and 32 respectively. Opposed thrust bearings 60 and 62 will accommodate axial loads, that is, loads applied along the rotation axis 36 and directed either toward or away from tool 22. With this configuration, the micro-machine may be capable of operation in all orientations and attitudes.

The micro-machine may be assembled with the following procedure. Rotor 12 (after assembly to flange 16 and overhang 14, if required) may be balanced to 0.1 microgram-meter (about 1.4 microinch-ounce avdp.) for a 6 to 8 mm (about 0.24 to 0.32 inch) shaft, 0.3 to 0.6 microgram-meter (about 4.2 to 8.4 microinch-ounce avdp.) for a shaft with a 4 mm (about 0.16 inch) diameter with a micro-balancing machine. Thrust bearing 60 may be positioned on ring 32, possibly in a mounting recess, not shown, of housing 52. The rotor may then be advanced into housing 52 containing foil journal bearing 30 in a direction corresponding to 'A' shown on FIG. 2 until turbine wheel/thrust disc 42 just contacts thrust bearing 60. Thrust bearing 62 may be inserted in recess 63 of ring 24 of housing 54. Housing 54 containing foil journal bearing 28 may then be inserted over rotor 12 in a direction shown as 'A' in FIG. 2 until turbine wheel/thrust disc 42 just contacts thrust bearing 62.

Housings 54 and 52 may then be releasably attached, for example, through the use of bolts (not shown) inserted into hole 70 and which engage the thread in aligned threaded hole 72. A V-clamp, sized to engage the cylindrical and end surfaces of flanges 24 and 32, may also be used. Generally, separate and independent alignment and attachment features may be employed for housings 52 and 54. Suitable alignment features may include mating features such as dowel pins on one housing engaging mating holes on the second housing (not shown).

Housing surfaces 28' and 30' support journal foil bearings 28 and 30 respectively. The relative alignment of all the bearings, but particularly of the journal bearings 28 and 30, will depend on the alignment, both angular and positional, achieved between housings 52 and 54. Because of the inherent compliance afforded by the foil bearings, both thrust and journal, some misalignment of the housings may be tolerated. However, it will be appreciated that compliant element foil bearings' internal components may be extremely thin with a total stack height of only 0.01 to 0.02 inches (0.0254 to 0.05 cm) so that any misalignment of housings 52 and 54 is likely to be minor.

More generally, it will be appreciated that the housings must be assembled and arranged to at least not exceed the maximum allowable bearing tolerance. Inasmuch as some of the maximum allowable bearing tolerance will be required to accommodate the dimensional changes undergone by the bearing as it expands due to temperature rise in use, in one embodiment the housing misalignment should preferably be maintained at no more than half of the total allowable tolerance.

The temperature rise of the bearing and thus the dimensional changes undergone by the bearing in use may be minimized by provision of features to promote enhanced cooling. A representative foil journal bearing adapted for such enhanced cooling is shown in FIGS. 4, 5, 6, and 7. FIG. 4 shows a foil journal bearing 100 with bearing center 110 in cross-section. The bearing may include a bearing shell 102 with features 104 such as one or more notches or grooves formed in an inner surface and adapted for retention of the bump foil 106 and top foil 108. Top foil 108 may incorporate features 105, for example, a tongue constructed and arranged to be generally complementary to shell feature 104, intended to compliantly engage shell features 104 and thereby retain the top foil under rotation of shaft 112 about center 114 in the direction indicated by arrow 111.

Figures 14, 15:
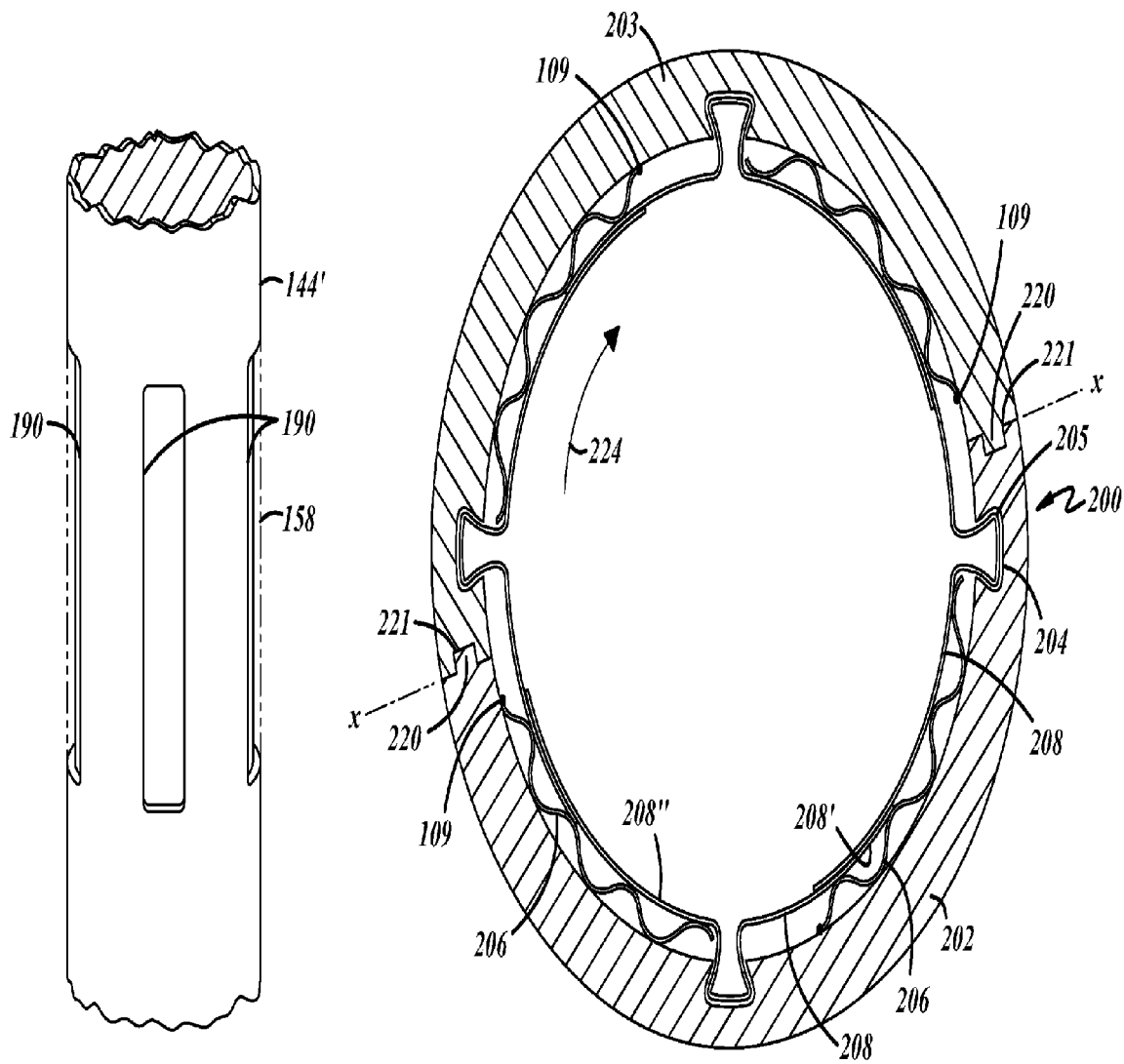
FIG. 14 shows a means by which the magnets may be assembled to and retained in a one-piece rotor to enable its use in the second embodiment of the invention.
FIG. 15 shows a first embodiment of a foil journal bearing adapted to generate increased hydrodynamic pressure.

Bump foil 106 may have a similar retaining feature 105' to feature 105 of top foil 108, as shown in fragmentary view FIG. 5, compliantly positioned and restrained between features 105 and 104. Alternatively, bump foil 106 may be secured by spot welding, as at 109, to shell 202 (FIG. 15). It will be appreciated that these attachment methods are alternate methods and are not to be employed in conjunction. As shown in FIG. 6, shell retaining feature 105 may incorporate slots 107 or similar features. Such features may be incorporated to maintain a more constant compliance of the top foil by at least partially offsetting the geometric stiffening resulting from introducing shaped retaining feature 105 and impart axial compliance to the bearing. These features are effective in imparting a self-alignment capability to the bearing to accommodate minor axial shaft misalignment.

The inclusion of grooved features 104 in bearing shell 102 may also be effective in promoting improved ingress of cooling air, and facilitates its distribution within the foil bearing to promote improved cooling. The process may be made even more effective by 'damming' or obstructing one end of groove 104 to induce circumferential airflow, as illustrated in FIGS. 6 and 7, which illustrates airflow in the direction of arrow 118 entering groove 104 at a first end 115 and exiting at second end 116. By blocking end 116, by a bent-up feature on top foil 108, or by forming groove 104 only partway into the bearing shell, to create, by means of the remaining shell portion, an endwall at 116, or by any other means known to those skilled in the art, incoming airflow 118 may be redirected circumferentially by means of slots 107 (FIG. 6) in directions shown by arrows 119 and 119' to more fully participate in cooling the journal bearing.

The benefits of such cooling may be appreciated by consideration of the relative locations of bearing center 110 and shaft 112 center 114. Because the bump foil is compliant, it may flex and displace when loaded by the film of air on which the shaft is supported. In operation, bearing heating may result in an increase in the shaft or journal temperature, causing it to expand and more closely approximate the diameter of the bearing shell. Thus, the greater the temperature rise of the journal, the greater the initial clearance and the greater the initial compliance which must be designed into the bearing, thereby compromising bearing stiffness and degrading the micro-machine accuracy. Hence, as will be discussed in greater detail in subsequent sections, it may be preferred that all bearings be gas-cooled and that the bearings, as indicated in the exemplary design of FIG. 4, be adapted to more efficiently receive and distribute the cooling gas.

Figure 8:
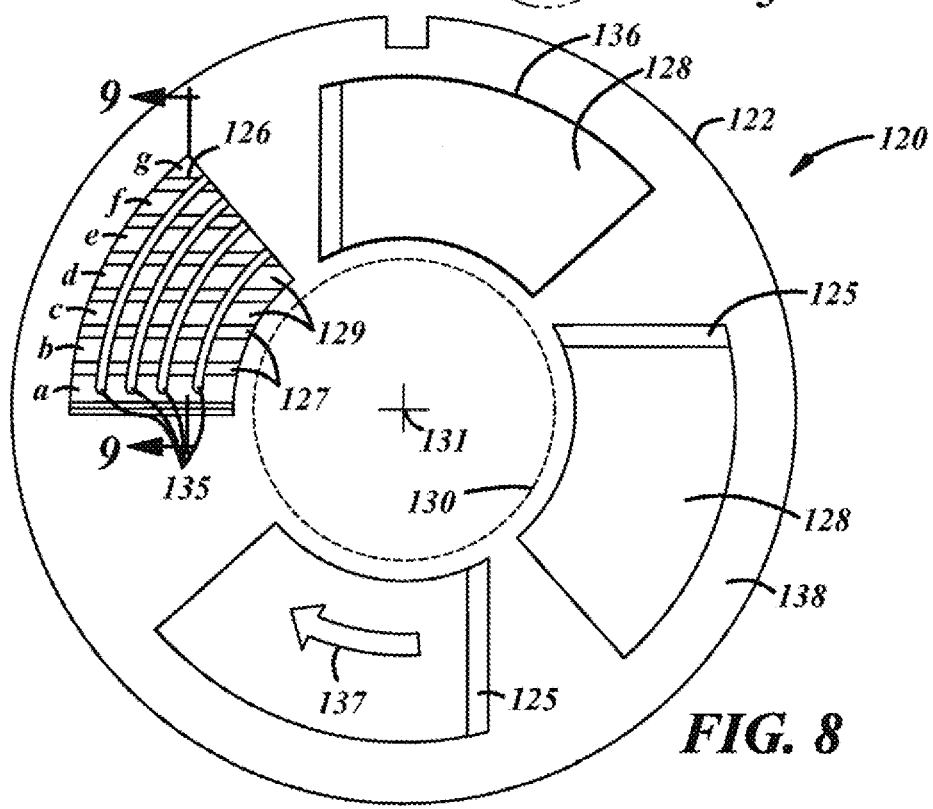
FIG. 8 shows, in partial cut-way, a plan view of foil thrust bearing with a slotted bump foil for improved bearing compliancy and cooling.

Similar considerations apply to foil thrust bearings, a representative example of which 120 is shown in partial cutaway plan view in FIG. 8 and in selected cross-section 9-9 in FIG. 9. Here, foil thrust bearing 120 may include bearing plate 122, suitably positioned with respect to shaft 130 rotating about its center 131 in a direction indicated by arrow 137. Bearing plate 122 may be overlaid by a plurality of bump foils, an example of which is shown as 126 and by a foil sheet 138 which has been slit and formed to develop a plurality of top foil segments 128 separated from foil disc 138 along a three-sided path shown as 136 and deformed to create an elevated lip 125 along its remaining line of attachment to foil disc 138. Bump foil 126, as best shown in FIG. 9, comprises a series of ridges 129 of varying heights separated by flats 127. The designators 'a-g' associated with the ridges of cross-section 9 correspond to the 'a-g' designators associated with bump foil 126 in FIG. 8. Foil 126 may include a plurality of circumferentially-oriented slots 135 to promote improved gas flow within the bearing and improved bearing cooling. Other features of foil thrust bearings adapted for use in micro-machining centers will be addressed in a subsequent section.

Returning to FIG. 2, ring 24 may receive pressurized air flow (or other process gas) through inlet port 80, which discharges at a higher, even supersonic speed, after passing through a series of guide-vanes 82. The developed jet flow may be directed toward reaction turbine blades 40 where it may transfer its kinetic energy to the blades to induce rotation of the rotor 12. After interacting with the turbine blades the process gas may expand and cool and primarily discharges into annular exit port 84.

As will be appreciated from the prior discussion of the characteristics of foil thrust bearings, clearance exists between the backing plate and bump foil/top foil combination of a thrust bearing. Thus, the pressurized gas of annular exit port 84 can bleed from the outer radius of thrust bearing 60 to its inner radius where it may then be constrained to flow through foil journal bearing 30 and between rotor 12 and housing 52. The overall flow path is indicated at 90 (FIG. 3). After traversing the length of housing 52, the gas flow may exit at end 53 of housing 52. A slinger washer (not shown) may be located at the point of exit to redirect the gas flow away from the cutting tool to minimize airborne debris. By this scheme of flow passages, the bearings may be both cooled and kept free of external contamination, such as the debris generated during cutting.

A parallel flow scheme, providing equivalent benefits, and shown as 92 in FIG. 3, may be followed for foil thrust bearing 62 and foil journal bearing 28. Here, however, there is no corresponding plenum to 84, and flow through the bearings simply results from the small but necessary clearances between the rotating turbine wheel/thrust disc 42 and the stationary flow shaping features of ring 24. Provision may also be made for bleed-off of excess gas if flow paths 90 or 92 become obstructed and create excessive back pressure. Openings 74 and 74', located on rings 32 and 24 respectively, may create pathways for release of vent flows 76 (FIG. 3) and 76' (FIG. 2).

Flow passages 90 and 92 assure that the thrust bearings 60 and 62 will not be deprived of cooling air as long as the rotor is rotating. Thus, there will always be cooling gas, which may also serve as a lubricant, available for the bearings. An additional benefit is that the gas flow may serve to exclude debris from the bearings.

Another means of managing machining debris is indicated in FIG. 1, which shows a series of channels 21 extending through flange 16 into the interior of rotor 12. These channels may extend radially outward from surface 16 to surface 16' of flange 15 and are inclined to rotation axis 36, as may best be seen in FIG. 10. Thus, the openings 21' of channels 21 on surface 16 may be located on the circumference of a first circle 37 on face 16, and the channels 21 may extend radially outward and at some inclination to rotation axis 36 to form openings 21" on surface 16', where openings 21" may be located on the circumference of a circle whose diameter is greater than that of circle 37.

Under rotation, this channel 21 configuration may act as a scoop and ensures that any debris entering openings 21' may be transported through channels 21 and deposited within hollow rotor 12, thereby minimizing airborne debris.

Figure 11:
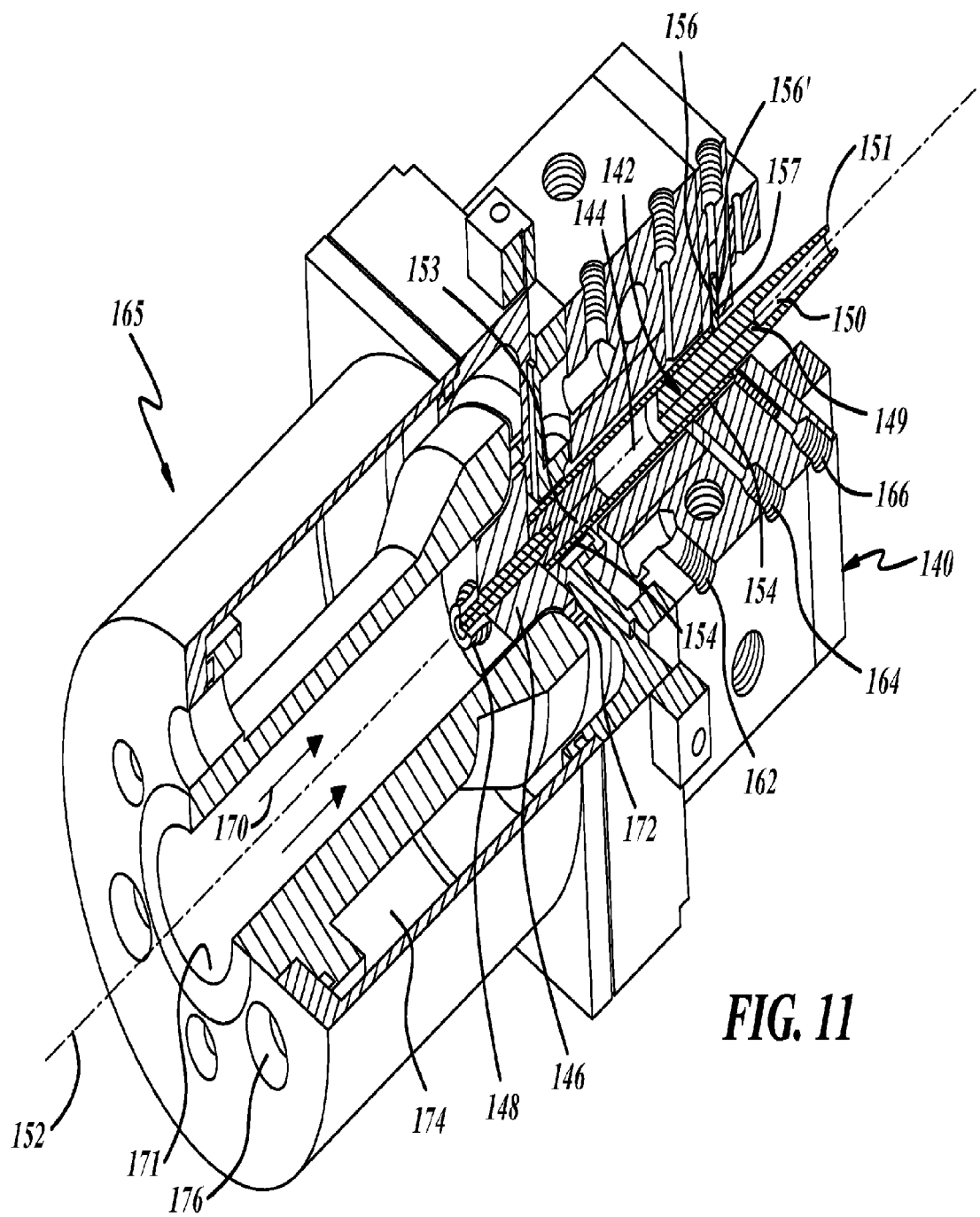
FIG. 11 shows, in quarter cutaway perspective, a second embodiment of the invention.
Figure 12:
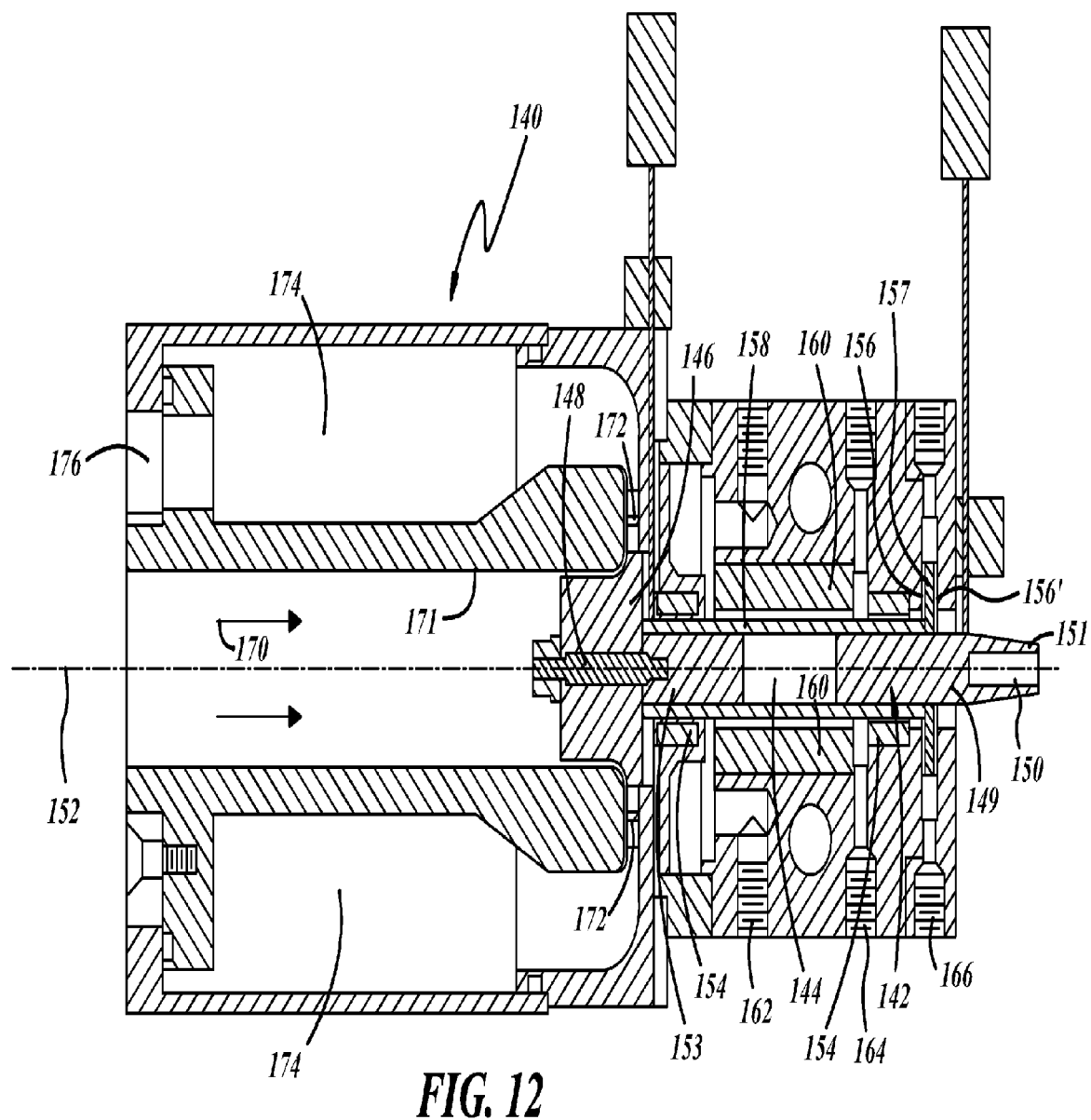
FIG. 12 shows the second embodiment of the invention in cross-section.

A second embodiment of the invention is shown in partial cutaway perspective in FIG. 11 and in section in FIG. 12. In this embodiment, the housing may be split longitudinally, that is, along the axis of rotation of the rotor.

Micro-machine 140 may include a rotor assembly 142 adapted to accommodate a cutting tool (not shown) in tool-holder portion 151, comprising tool-holder cavity 150. Rotor assembly 142 may be an assembled multi-piece rotor comprising permanent magnet motor rotor 144, tool-holder portion 151, and impeller attachment portion 153, with all three pieces secured and attached to one another through shrink-fitted sleeve 158. As shown, radial flow compressor impeller 146 may be a separate element attached to rotor assembly 142, specifically to impeller attachment portion 153, for example, by mechanical fastener 148. However, radial flow compressor impeller 146 and impeller attachment portion 153 may also be fabricated as a single piece. Stator 160 may be incorporated in split machine housing 165 and positioned to cooperatively interact with permanent magnet motor rotor 144 to induce rotation of rotor assembly 142.

Rotor assembly 142 may be supported on split journal foil air bearings 154 and restrained from motion along the direction of rotation axis 152 by housing-mounted, opposed thrust bearings 156, 156' acting against rotor disc 157. Cooling gas inlets 164, 166 may be provided to direct pressurized cooling gas to journal bearings 154 (inlet 164) and to thrust bearings 156 (inlet 166). After passing over the bearings, the cooling gas may be discharged at outlet 162.

Pressurized cooling gas may be derived from any convenient source. The micro-machine shown may be capable of providing pressurized air without recourse to an external source. Here, incoming air flow 170, induced by rotation of impeller 146, passes through air passage 171 and may be compressed by cooperative interaction of impeller 146 and the shaped inner surfaces of air passage 171 and discharged through ducts 172 into storage tank 174, where it may be accessed at outlet 176 and fed through cooling ports 164 and 166 in controlled fashion.

Rotor assembly 142 has been described as a multi-piece rotor comprising tool-holder portion 151, impeller attachment portion 153, and permanent magnet rotor 144, which may be permanently attached using a shrink-fitted sleeve. The shank or solid portion (i.e., not containing the tool-holder cavity 150) of the tool-holder portion is illustrated at 149. As depicted, the various elements are shown in butt-joint configuration so that only the frictional interaction between the sleeve and the individual elements enables torque transmission from one element to another. Another approach may be to incorporate complementary features on the abutting members to improve the mechanical interlock. An example is shown in FIG. 13, which, without limitation, shows permanent magnet rotor 144 with slot 180 and tool-holder portion 151 with complementary key 181. When properly aligned, key 181 will tightly engage slot 180 when face 182 abuts face 183. Thus, the mechanical engagement of key 181 and slot 180 will be effective in transmitting torque while a shrink-fitted sleeve may overlie shaft surfaces 184 and 185 and hold them in longitudinal alignment. Of course, more complex mechanically-engaging features than the slot and key configuration shown may also be adopted. These may include configurations which also tend to axially align the shaft surfaces 183, 184.

It may also be possible to fabricate rotor assembly 142 as a one piece non-magnetic shaft, not incorporating compressor impeller 146, comprising slots or pockets for incorporation of magnets for the rotor and a short shrink-fitted sleeve to aid in magnet retention under rotation. Such a configuration is shown in FIG. 14, which may show a segment of rotor assembly 142 which may have been suitably pocketed or slit at locations 190 to accept appropriately oriented magnets which may be retained at least by shrink-fitted sleeve 158, and may be supplemented by adhesive or other retention means.

Fabrication of the micro-machine may include; finishing the assembly of the rotating group first; conducting final machining/polishing and balancing to achieve acceptable rotor dynamic behavior; positioning the rotor in bearings; positioning the rotor and bearings in one of the parts of the split housing; and finalizing assembly by positioning and releasably attaching the remaining parts of the split housing. The assembly may be performed in this sequence to ensure acceptable rotor dynamic behavior, which is not achievable if the rotor is not balanced as a complete assembly. It will be appreciated by reference to FIGS. 11 and 12 that this assembly sequence may be facilitated by the journal and thrust bearings being split bearings. Details of the split bearing designs which may be employed will be discussed in a later section.

The assembled complete rotor, as shown in FIGS. 11 and 12, may be driven by the electric motor comprised of permanent magnet rotor 144 and stator 160, which together form a brushless DC electric motor. As is well known to those skilled in the art, the stator of such a motor comprises electrically conducting coils energized by an electronic commutation controller system (not shown). Stator 160, like the bearings, may be split along the split axis or axes of the housing, requiring that electrical connection (not shown) be made between the windings associated with the split portions of the stator wiring for motor operation. Upon reaching its maximum operating speed, compressor impeller 153 in cooperation with the shaped interior surfaces of air passage 171 produces pressurized air to greater than ambient pressure which may be temporarily stored in tank 174. When required, the pressurized air may be directed through exit port 176 to the bearings and the motor rotor and stator in order to minimize any temperature rise. After cooling the machine elements, the air may be vented at port 162, though it may be preferred that some air bleed past the clearance between tool holder portion 149 and housing 165 and thereby be directed toward the work piece, in order to remove the debris and cool the cutting edges of tool 151.

Thrust bearings 156 and 156' may be cooled from their outer diameters toward their inner diameters by directing cooling flow from port 166. This is effective in enhancing the cooling because it is in opposition to the flow of frictionally-heated air impelled by centrifugal force imparted by rotor disk 157 toward the outer diameter. By directing cooling air flow, in the radially inward direction, the two opposing fluid flows are in "counter-flow" configuration which maximizes heat exchange and more effectively cools the thrust bearings.

The micro-machine design shown in FIGS. 11 and 12 may, with minor modification, be adapted to operate on pressurized gas and thereby eliminate the electric motor. In a first design variant, the motor may be operated on pressurized gas introduced at air passage 171. By modification of compressor impeller 146, it may be adapted to function as a radial turbine inducing rotation of rotor assembly 142 and discharging air, still at greater than atmospheric pressure, into tank 174. Alternatively, the machine may be constructed with the drive systems, electric and gas shown and used either in either mode.

In a second design variant, an independent turbine may include an impeller suitably surrounded by gas flow shaping surfaces formed in housing 165 and may be located on and coupled to rotor assembly 142 and operated by pressurized gas. No other modifications need be made to the micro-machine. In this design variant, the gas discharged from the independent turbine may simply be vented, and the cooling air stored and discharged from tank 174 may be generated by impeller 146 as previously described.

Foil journal and thrust bearings adapted for improved cooling and thereby suited for use in micro-machining centers have been previously described. These bearings may incorporate other novel features as described below.

Another embodiment of a foil journal bearing 200 may be shown in FIG. 15. In this design, each of a plurality of top foils 206 may be secured to a split housing comprising (housing) shell elements 202 and 203 by spot welds 109. In common with the bearing 100 of FIG. 4, the top foils of bearing 200 may overlie a number of suitably-secured corrugated bump foils 206. Bump foils 206 may be secured to the housing 202 by spot welds 109 and compliantly distance top foils 208 from the inner diameter of housing 202. It should be noted that bearing housing 202 may be split along line x-x and readily and consistently re-assembled. Shell elements 202, 203 may include complementary alignment or engagement features such as guide pins 220 fitting into reamed holes 221, or shoulder screws engaging complementary partially-threaded holes (not shown) to ensure alignment. Alternatively, alignment may be achieved through dimensional control and alignment of the bearing support features in a split housing.

Top foils 208 may circumferentially extend on either side of their mounting locations and have both a trailing edge segment 208' and a leading edge segment 208" relative to their attachment location. As shown, each top foil 208 necessarily comprises a leading edge and a trailing edge. With appropriate modification to the top foil 208 mounting and retention procedure, top foil lengths corresponding to the leading edge length and to the trailing edge length may be independently mounted adjacent to one another without prejudice to their performance. However, there may be a definite relationship between the bump foil strips and the top foil and in the way they are anchored to the bearing shell. As shown in FIG. 15, attachment points 109 may always be located in the vicinity of the trailing end of the uppermost of the overlying top foil segments. This may be done to systematically vary the structural stiffness of each foil segment from leading end to trailing end of top foil 108.

As shown in FIG. 15, the lengths of trailing 208' and leading 208" edge segments may be unequal but, in a design with N foils, their lengths are so chosen as to enable the trailing edge of a first foil to overlie the leading edge of a second foil and the trailing edge of a second foil to overlie the leading edge of a third foil. This relative foil placement continues around the inner circumference of the bearing housing until the trailing edge of the Nth foil overlies the leading edge of the first foil, thereby extending the composite top foil surface around the entire inner circumference of the housing, as shown by the four-top-foil configuration shown in FIG. 15.

In operation, the shaft's surface is initially in rubbing contact with the top foil surfaces until, with increasing shaft rotation speed, a thin hydrodynamic film develops between the shaft and top foil surface. The shaft is then levitated from the bearing's surface and separated from it by an air film.

The top foil 208 may be free, subject to any restoring forces exerted by compliant bump foil 206, to bend and pivot about the center of the bearing mounting groove 204, responsive to the influence of the dynamic, static, or thermal movements of the shaft with respect to the bearing. Top foil 208 may also deform elastically, and such elastic deformation may be local. For example, the trailing edge 208" of a first top foil, partially supported by the leading edge 208' of a second top foil, as shown in their unloaded configuration in FIG. 15, may locally deform, as shown in the fragmentary view of bearing 200 shown in FIG. 16, to create a stepped bearing surface at 209. This stepped bearing surface 209 creates an "elasto-pressure dam" which is effective in enhancing the hydrodynamic pressure profile resulting from the shaft-bearing interaction, enabling higher bearing loads and more rapid development of the hydrodynamic film.

Figure 16:
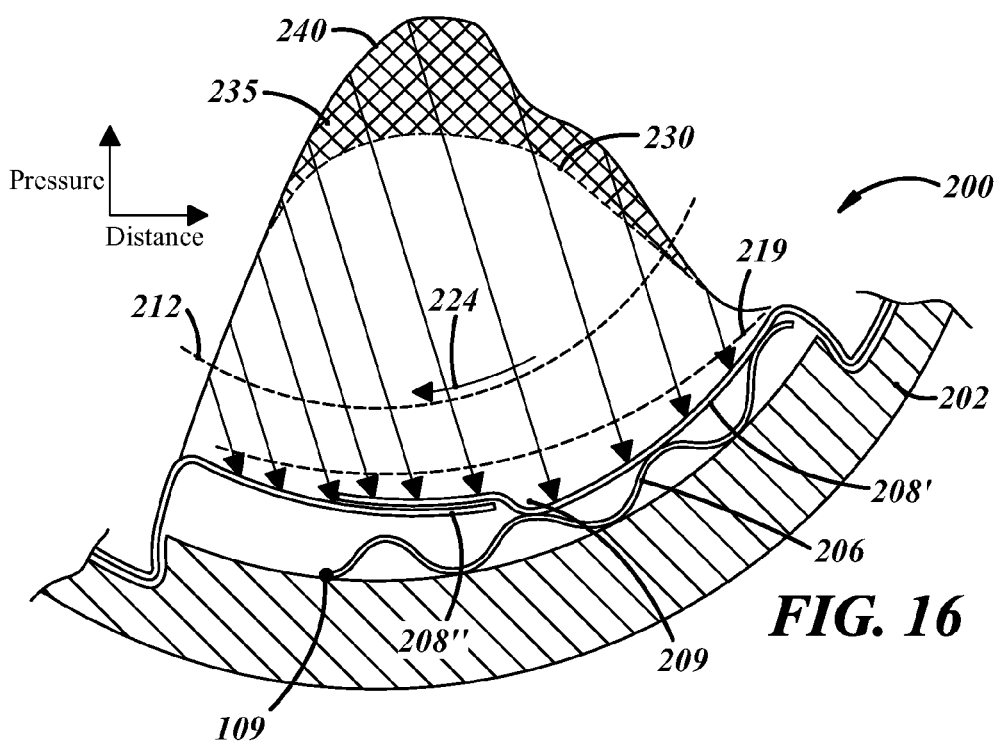
FIG. 16 shows the top foil configuration and the generated hydrodynamic pressure profile of the foil journal bearing of FIG. 11 during operation, and compares its top foil configuration and hydrodynamic pressure profile during operation with that of a more conventional foil journal bearing.

In one embodiment, curve 240 (FIG. 16) shows the pressure versus distance, measured along the bearing, developed by shaft 212 rotating in a direction indicated by arrow 224 for a top foil deformed to develop feature 209. The top foil configuration shown may be typical, for example, of the configuration which would be adopted by the bearing of FIG. 11 under the same conditions. FIG. 16 also shows, as curve 230, the pressure versus distance profile which may be developed by a more conventional top foil configuration 219, shown in ghost. The increase in hydrodynamic pressure generated by the elasto-pressure dam according to one embodiment may be identified by the cross-hatched area 235 representing the difference between the hydrodynamic pressure profiles. The elasto-pressure dam may also increase damping and improve bearing stability and provide pressure variation that is effective in pumping additional air through the bearing for more efficient bearing cooling.

The novel stepped bearing surface may also accommodate two-phase (gas-liquid) flow, for example, compressed air with entrained water droplets. In conventional foil journal bearings, any liquid mixed with the gas vaporizes. Because the mixture is heated by passage through the bearing clearance, it results in a significant volume expansion and precipitates a rapid pressure rise, which if severe may interfere with proper bearing operation. But a compliant elasto-pressure dam may respond to the localized rise in pressure by deforming further, thereby relieving the pressure increase and promoting stable bearing operation.

Other embodiments are also within the scope of the invention. The structural compliance of foil bearings, as described here, may be established through the interaction of the top foil with the underlying bump foil, which is deformed or corrugated to a form comprising an alternating series of ridges and flats. These bump foils 106, 206, as shown in FIGS. 4 and 15, are anchored at one end and free at the other end and thus may slide circumferentially, and provide damping, when pressure is applied radially, for example, if the shaft is displaced from its original central position toward the bearing housing wall.

Generally, the bump foil 206 height or the change in height between adjacent ridge tops and flat bottoms in the bump foil is constant and independent of position in the foil, leading to a uniform elastic response at any location along their length. However, as illustrated in FIG. 16, the elasto-pressure dam may arise in response to a local geometric irregularity 209. In the case shown in FIG. 16, geometric irregularity 209 is attendant on the geometric discontinuity resulting from the overlapping top foil geometry, where portion 208" overlies portion 208' of the adjacent top foil. But similar results may be obtained through the use of a bump foil whose compliance varies with position in a predictable manner.

Figure 17:
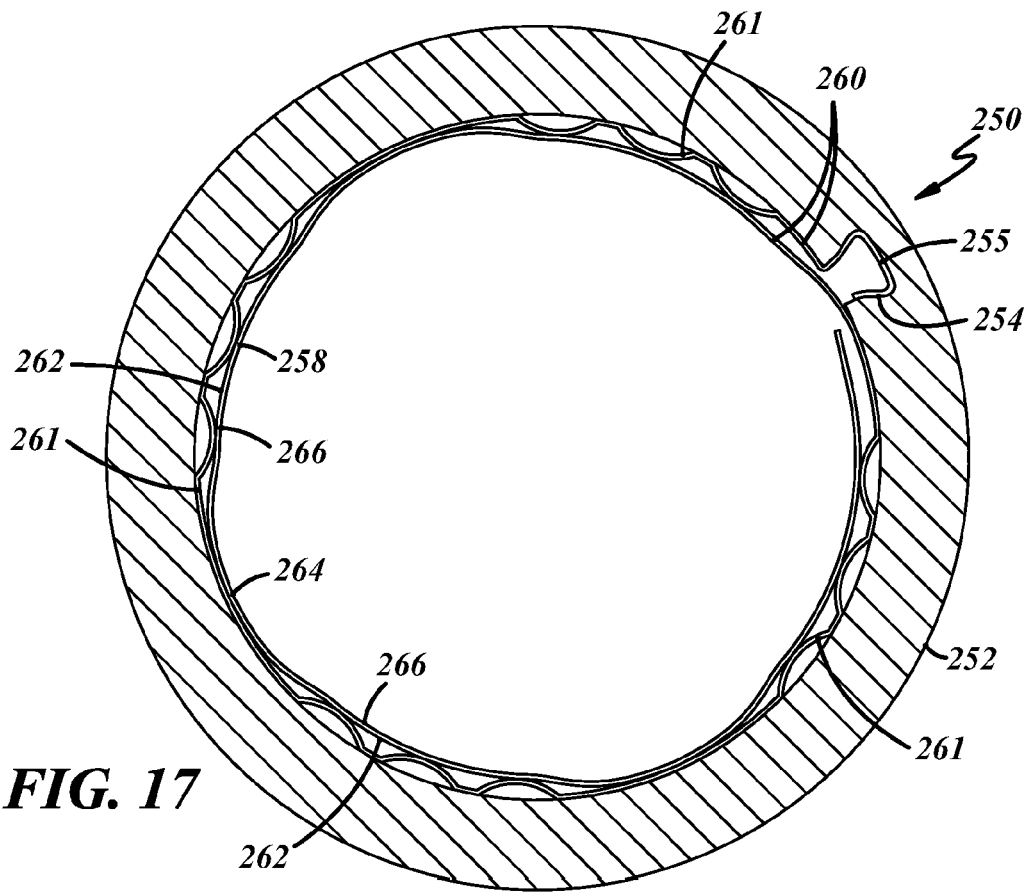
FIG. 17 shows a second embodiment of a foil journal bearing adapted to generate increased hydrodynamic pressure.

A suitable configuration is shown in FIG. 17, which shows a foil journal bearing 250 with a single foil 260 with a retaining feature 255 engaging complementary groove 254 in housing 252. Foil 260 may comprise a first, partially corrugated, portion of foil 261 in contact with the inner diameter of shell 252 and approximately equal in length to the circumference of the inner shell diameter; and a second, planar, portion 262, again of length approximately equal to the circumference of the inner shell diameter, overlying portion 261. Foil 260 is shown in its operating configuration.

At locations 264, top foil 262 is unsupported by any corrugations like those at locations 266. At locations 264, therefore, top foil 262 may adopt, as shown, a configuration similar to that shown at 209 in FIG. 16, that is, it may exhibit a configuration like that of the elasto-pressure dam described previously (209 at FIG. 16).

Similar performance may be obtained with other top foil and bump foil configurations. For example, in FIG. 18, bearing 270 may comprise a separate bump foil 276 secured at retainer groove 274' in housing 272, again exhibiting corrugated and non-corrugated portions, and a separate top foil 278 secured at retainer groove 274 in housing 272. In another exemplary foil journal bearing 280, shown in FIG. 19, a single foil 281 may comprise a bump foil 286 exhibiting corrugated and non-corrugated sections and a smooth top foil 288 which overlies it. The individual sections are disposed on either side of retainer groove 284 located in housing 282 and complementary foil retaining feature 285. Bump foil segment 286 extends in counterclockwise orientation and underlies top foil section 288 which extends clockwise. It will be appreciated that housings 252, 272, and 282 for the journal bearings shown in FIGS. 17, 18, and 19 may also be split for ease of assembly and disassembly. In this case, the bump foils and top foils may be unwrapped from the shaft for bearing disassembly or wrapped around the shaft for assembly.

In FIG. 19, the retaining groove 284 and complementary retaining feature 285 are not trapezoidal as previously shown, but generally resemble the upper case Greek letter omega. It will be appreciated that the specific design approaches described and depicted are illustrative and not limiting. A variety of tongue and groove or mating or nested retaining features are within the scope of the invention.

In other select embodiments, the longitudinally-varying bump foil geometry of FIGS. 17 to 19 need not symmetrically increase and decrease but may slowly ramp up and rapidly decrease, as shown in the partial bump foil segment 296 shown in FIG. 20. The ability to systematically vary bump foil stiffness is not limited to only the designs shown but may be employed in any foil journal bearing including the designs of FIGS. 4 and 15. Finally, the bearing may employ more than a single bump foil so that the bump foils will act cooperatively. Exemplary configurations are shown in FIGS. 21, 22, and 23.

Figure 21:
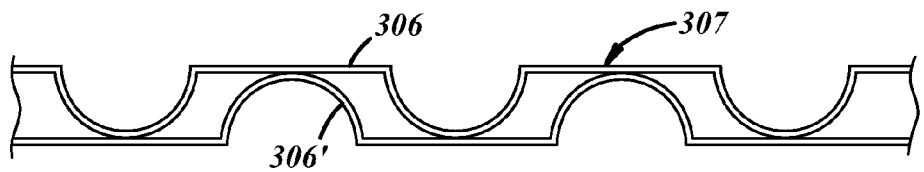
FIGS. 21, 22 and 23 show exemplary composite bump foils fabricated from two individual bump foils.

In FIG. 21, portions of two identical bump foil segments 306 and 306' are shown arranged in opposition to cooperatively deform under all loadings and, in combination, form composite bump foil 307.

Figure 22:
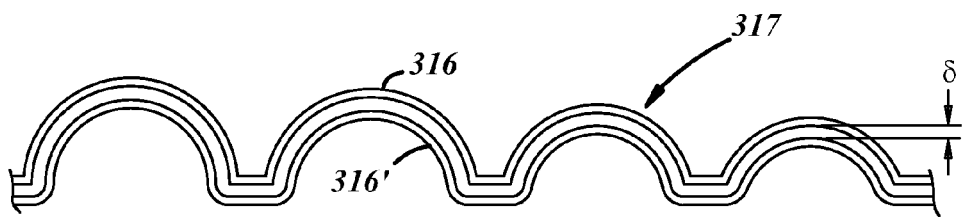
Figure 23:
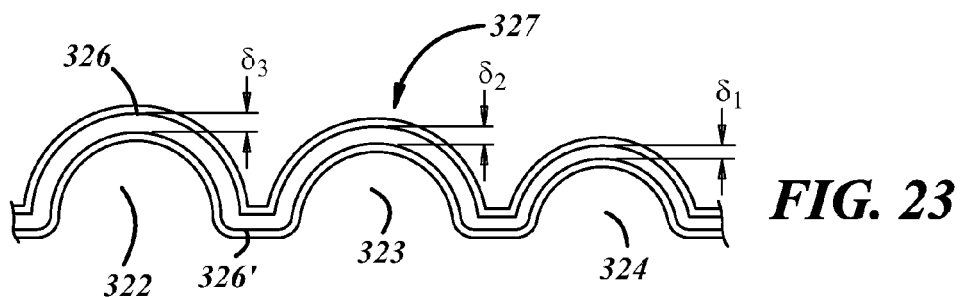

In FIG. 22, two bump foils 316 and 316' of varying height are nested to form composite bump foil 317. Bump foil 317 enables abruptly varying bump foil stiffness with displacement since bump foil 316' will contribute to the over bump foil stiffness only after bump foil 316 has been deflected by the amount shown in FIG. 22. It will be appreciated that the spacing between individual ridges, shown as constant in FIG. 22, may be varied as in FIG. 23 to enable more progressive stiffness variation with displacement. In fragmentary view in FIG. 23, nested individual bump foils 326 and 326' comprise composite bump foil 327. In this configuration, however, the separation between the bump foils may vary. Thus, using in this paragraph for convenience the letter S instead of the symbol shown in FIGS. 22 and 23 along with the associated numbers not as sub-scripts, at location 324, the maximum separation is S1, at location 323 the maximum separation is S2, and at location 322 the maximum separation is S3. Because S1<S2<S3, the stiffness of composite bump foil 327 will progressively increase with displacement.

All the composite bump foil configurations shown were fabricated from two individual bump foils. This is not intended as a limitation and it is recognized that the concepts may be readily extended to comprehend more than two individual foils.

Figure 24:
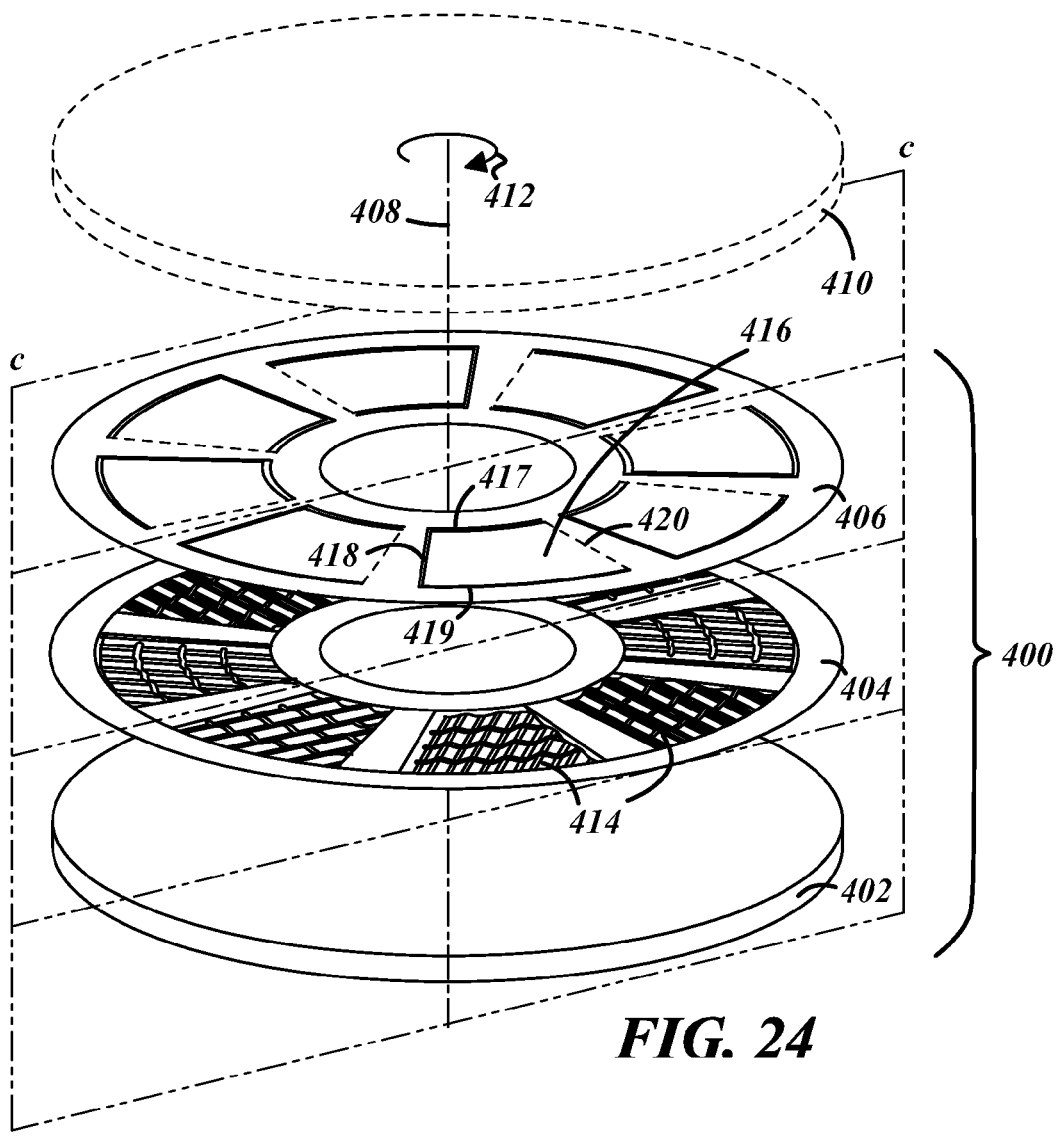
FIG. 24 shows, in exploded perspective view, an embodiment of a foil thrust bearing.

One embodiment of a foil thrust bearing design 400 is shown in exploded perspective view in FIG. 24. Thrust foil bearing 400 may include an underlying thrust plate 402, bump foil sheet 404, and an overlying top foil sheet 406 positioned and located axially about centerline 408, which is the axis of rotation of runner 410 (shown in ghost) rotating in a direction indicated by arrow 412. Bump foil sheet 404 may include a plurality of equally-spaced corrugated annular segments 414 each of which may be overlaid by a top foil pad 416 bounded by three slits 417, 418, and 419 and may remain secured to top foil sheet 406 only along line 420. Pad 416 may therefore be free to flex and pivot about line 420 in response to any applied load with a component directed along centerline 408. In similar manner to the foil journal bearing, because pad 416 may elastically deform under load, the shape which it adopts will be moderated by the corrugated foil segment 414 which underlies it. Again corrugated bump foil pad 414 should be suitably profiled to induce in the top foil a preferred configuration when under load.

Figure 25:
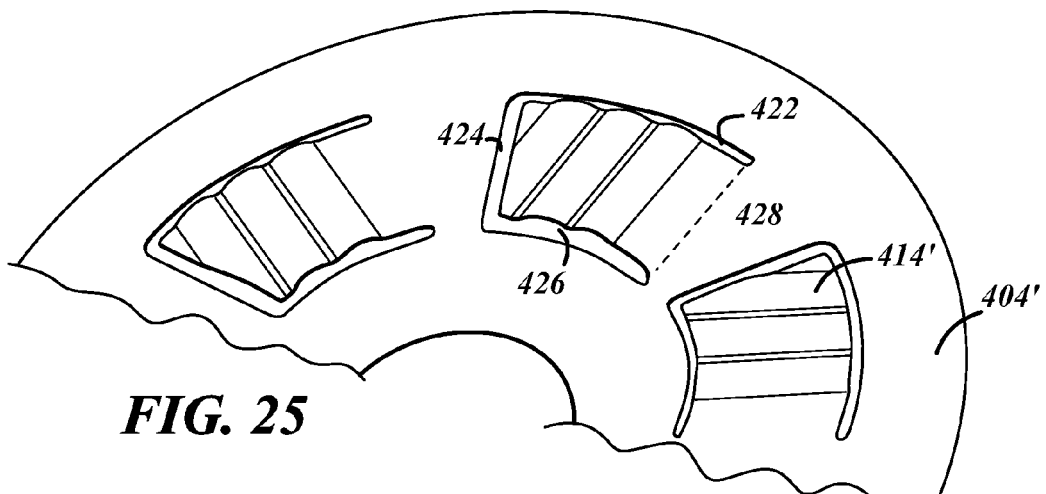
FIG. 25 shows in fragmentary perspective view an embodiment of a bump pad similar to that shown in FIG. 24.

The corrugated bump foil pads 414 may be fabricated as individual corrugated segments and attached directly to thrust plate 402; examples of this configuration will be shown later. The configuration shown in FIG. 18 may however be formed in similar fashion to that employed to form the top foil pads 416. Thus, as shown in FIG. 25, bump foil sheet 404' may be shaped and formed by stamping then slit along slit lines 422, 424 and 426 to form bump foil tab 414' secured to bump foil sheet 404' along line 428. The tab may then be shaped and formed by stamping to form bump foil tab 414'. The embodiment shown in FIG. 24 in which a plurality of bump foil pads 414 and pads 416 may be formed from, and remain attached to, a larger foil sheet (404 and 406 respectively) may be preferred for fabrication of small bearings, for example, those bearings with outer diameters of between 0.1 inch and 2 inches (0.254 cm and 5 cm). It will be appreciated that as the bearing size decreases the dimensions of pads 414 and 416 will likewise decrease and may pose increasing challenges in reliably positioning and attaching these pads to a thrust plate 402. Larger bearings, say up to 100 inches (2.54 meters) in diameter, may optionally employ individual bump foils and pads or may continue to employ the foil sheet construction elements of the small bearings.

It may be noted that because the bearing may include a number of equally spaced bearing elements 414, 416 the bearing may be readily split, for example, along C-C (FIG. 24) to facilitate installation. As with the split journal bearing, it may be preferred to introduce features such as guide pins fitting into reamed holes, or shoulder screws engaging complementary partially-threaded holes (not shown) to assure alignment on re-attaching the split bearing segments. To facilitate reassembly, it may be preferred to split thrust plate 402 but to only partially split bump foil sheet 404 and top foil sheet 406, for example, from their outer circumference to centerline 408. For such a thrust bearing, the sheets 404, 406 may be elastically flexed to enable sufficient clearance around a shaft, for example, tool-holder portion 149 in FIG. 11, for bearing installation and removal.

Figure 26:
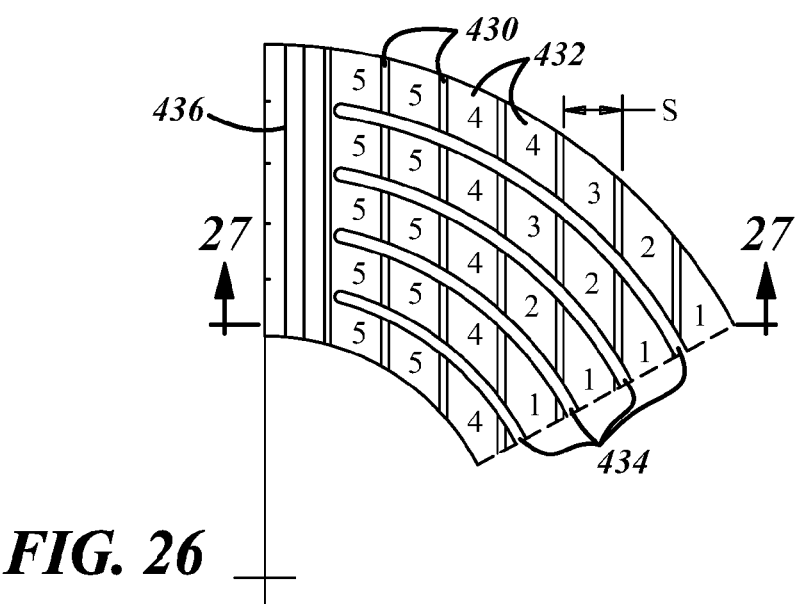
FIG. 26 shows a first preferred embodiment of a bump foil pad.

Another embodiment of a bump foil configuration 414 is shown in plan view in FIG. 26. As with the journal bearing, the bump foil may include a series of alternating flats 430 and ridges 432 here separated into individual sectors by circumferential slits 434. The heights of the ridges 430 may vary with their location in the foil. In this figure, the ridge to ridge or flat to flat spacing 'S' is constant, but other configurations in which the dimension 'S' will vary with position on the foil are also comprehended in this description. The relative ridge height may be indicated by the numbers 1 to 5 associated with the ridges respectively, where 5 may represent a large ridge height and 1 a small ridge height Like the bump foil shown in FIG. 8, the foil of FIG. 26 may be circumferentially slit. The slits 434 may minimize 'cross-talk' between adjacent ridge-flat tabs and thereby enable each ridge-flat tab to respond to an applied load more independently of its neighbors. Slits 434 may also facilitate cooling gas flow through the bearing.

Figure 27:
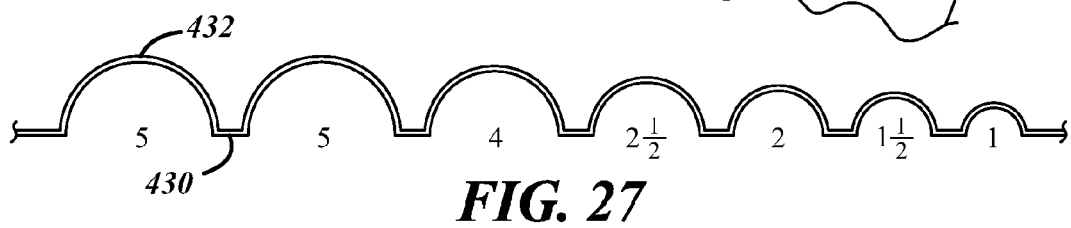
FIG. 27 shows the bump foil profile taken along line 27-27 shown in FIG. 26.

Thus, each ridge 432 may comprise only a portion of the overall radial distance spanned by the overall bump foil 414. The ridge 432 heights may vary systematically with position and the ridge height variation generally conforms to a compound wedge. The compound wedge may taper upward, both circumferentially from the leading edge of the foil to the trailing edge and also from the leading edge of the bump foil outer circumference to the trailing edge of the inner circumference. FIG. 27 is a section taken along line 27-27 in FIGS. 18 and 20 and shows the relative ridge 432 height variation from the leading edge of the bump foil outer circumference to the trailing edge of the inner circumference. As will be appreciated by consideration of items 1 to 5, the height of the bumps may gradually increase from item 1 to item 5.

As a consequence of this configuration, a cross flow may be induced in the fluid in the composite diverging wedge region. In this region the fluid may be subject to a circumferential pressure gradient which may encourage the fluid film to move along circumferential stream lines. However, there may also be centrifugal forces promoting radial flow.

Figure 28:
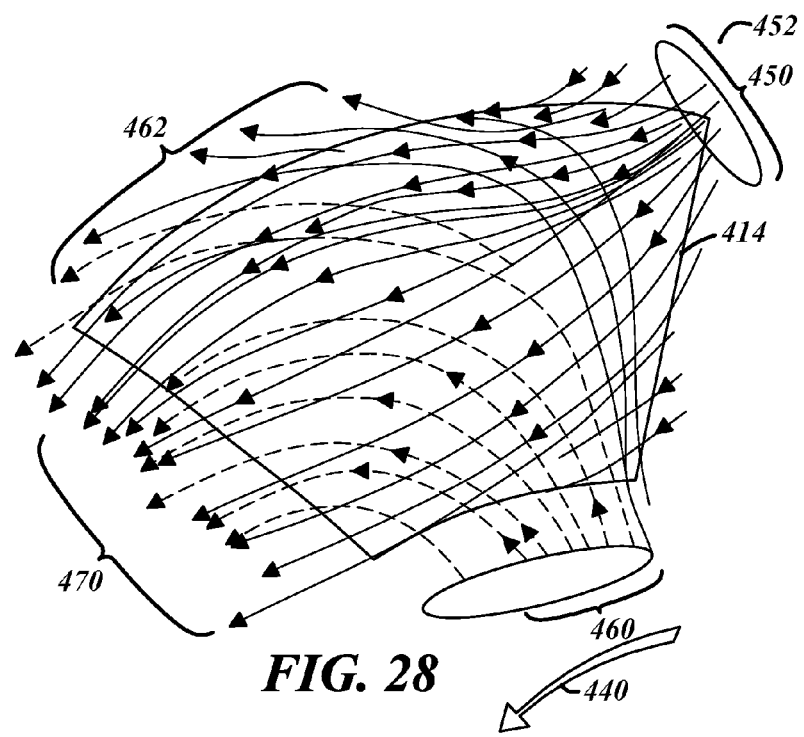
FIG. 28 shows the streamlines of fluid flow over an operating foil bearing pad.

These two components of the flow velocities may be orthogonal to each other in the compound tapered region. This flow behavior, depicted as a series of streamlines overlaid on the outline of a bearing pad segment 414, may be shown in FIG. 28. The runner velocity may be in the direction of arrow 440. The circumferential flow (stream lines 450) entering the bearing gap space may interact with radial, centrifugally-induced flow (streamlines 460, shown as dotted) and may be very effective in transferring momentum to the radial flow and imparting a circumferential component to the stream lines. Thus, little side leakage (streamlines 462) may occur, and most of the flow may exit the pad at the trailing edge, flowing in a generally circumferential direction (streamlines 470). It will be obvious by reference to FIG. 24 that this circumferential flow shown exiting pad 414 may become an incoming circumferential flow for the next downstream pad.

This flow behavior may have consequences for bearing cooling. The radially-flowing air, drawn from the bearing inner circumference, will be cool. Some portion of the circumferentially-directed air may be cool air drawn from beyond the outer bearing circumference, as indicated at 452, but a significant proportion will be previously-heated air drawn from the upstream pad. Since little side leakage 460 occurs, the small volume of heated air which may be lost to side leakage may make little contribution to bearing cooling.

Figure 29:
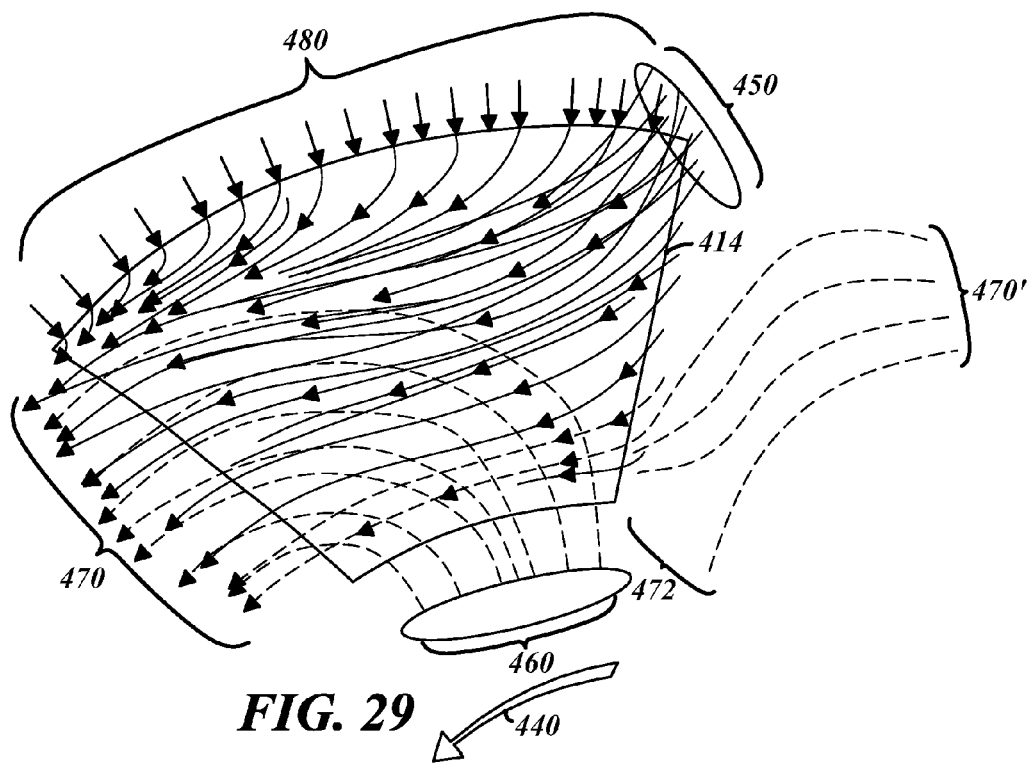
FIG. 29 shows the streamlines of fluid flow over an operating foil bearing pad when radially-inflowing pressurized air is introduced at the outer diameter of the bearing pad.

In FIG. 29, the effect of providing a pressurized airflow (streamlines 480) at the outer circumference of the pad according to one embodiment is illustrated. Obviously, the cooling airflow, acting in opposition to the centrifugally-directed fluid (streamlines 460), may promote ingress of a much larger volume of cooling air (streamlines 450) and dramatically expand the region where an incoming flow of cool air is dominant, providing enhanced cooling. This may result from the fact that the inwardly directed flow of cool air, in continuing to act on the exiting air flow, may direct a significant portion of the flow exiting at pad trailing edge inward, that is, toward the axis of rotation. The inward flow may remove the heated air and permit expanded access of cooling air, as described above. Thus, incoming streamlines 470' from the upstream pad may be redirected toward the axis of rotation (408 in FIG. 24), as shown figuratively by streamlines 472.

Figure 30:
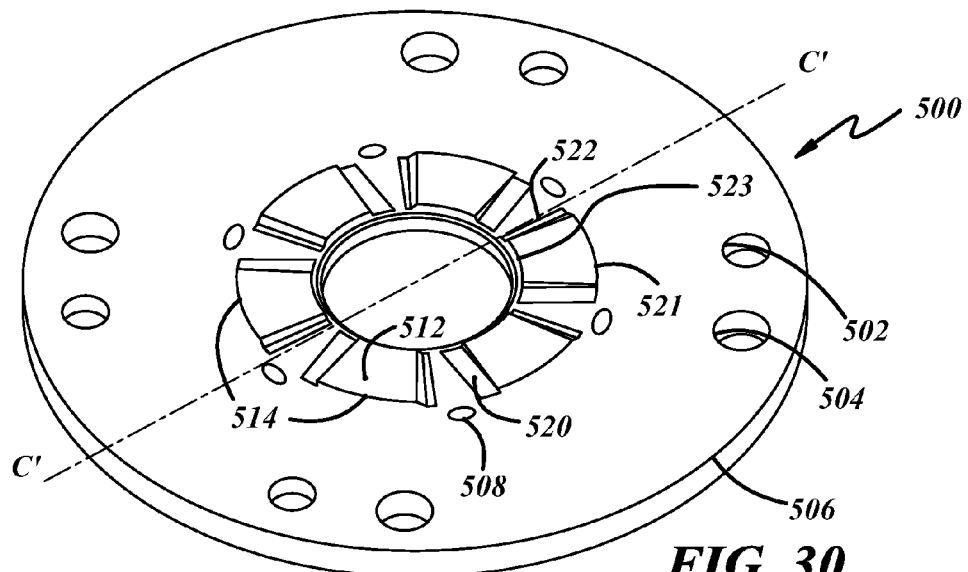
FIG. 30 shows a second embodiment of a foil thrust bearing.

If the bearing is mounted on the outer diameter of the thrust plate, it may be fully accessible to an inwardly-directed radial airflow. However, if the bearing is mounted interior to the outer diameter, it may be beneficial to introduce openings or channels into the thrust plate to enable air access. The openings may be aligned with the gaps between pads. Such a configuration is illustrated in FIG. 30, which shows an alternate bearing design 500 in which the top foil pads 512 and bump foil pads 514 are individually attached to the thrust plate 506. The top foils shown in FIG. 30 have tabs 520 which may be secured, for example, by welding to thrust plate 506; edges 521, 522, and 523 are unsecured. Note that this bearing may also be split, for example, along line C'-C', and that if split (not shown), the individual elements of the bearing may incorporate features constructed and arranged for reassembly and alignment as described previously (not shown).

It is well known that a turbulent boundary layer is better able to maintain its attachment to a surface than a laminar boundary layer when the fluid film flow velocities are transonic or supersonic so that a turbulent boundary layer may result in less pressure drag and less heat generation. For at least this reason, it may be preferred to develop a turbulent boundary layer on the top foil.

Smooth or flat surfaces may promote a laminar boundary layer while uneven surfaces or those of irregular height may be more likely to promote development of the more desirable turbulent boundary layer. Surfaces with generally uniformly-spaced height irregularities of similar scale in regular spaced-apart configuration, for example, dimpled surfaces, may be especially effective in promoting turbulent boundary layer formation across the entire surface.

Textured surface patterns with concavity and convexity, analogous to dimples, may be fabricated on the top foil and/or runner or on coatings applied to them, using various techniques (laser beam, EDM, chemical etching, etc.). The depths of such recesses may be about a fraction of fluid film thickness (0.00002 to 0.0004 inch or 0.00005 to 0.0001 cm). However, such fine features may be worn away by any rubbing of the runner on the top foil which may occur during start-up and shut-down.

The wear process which may occur on start-up and shutdown may be used to advantage, since the wear may promote the development of the desired spaced-apart surface irregularities. Consider the configuration shown in FIG. 26. Before a supporting air film is fully developed, runner 410 may rub against top foil pad 416 (FIG. 24). However, top foil pad 416 may be supported by the corrugated annular segments 414 of bump foil sheet 404. Hence, the stiffness, and thus the local pressure during wear of the top foil, may be greatest in those locations where the bump foil ridges 432 (FIG. 27) directly support the top foil. This may produce non-uniform and local wear of the top foil creating an array of worn regions distributed across the top foil. These worn regions may form a series of depressions in the top foil during normal bearing operation and may promote formation of the desirable turbulent boundary layer.

Wear of the top foil may be minimized by the addition of lubricious, wear-resistant, coatings such as KOROLON (trademark) 1350 coating, a proprietary, spray-gun-applied, nickel-chrome coating with solid lubricants. However, the more effective the wear-resistant coating, the greater the likelihood that the top foil may not acquire the wear-induced surface features, resulting in a greater tendency for the boundary air flow to remain laminar.

Figure 32:
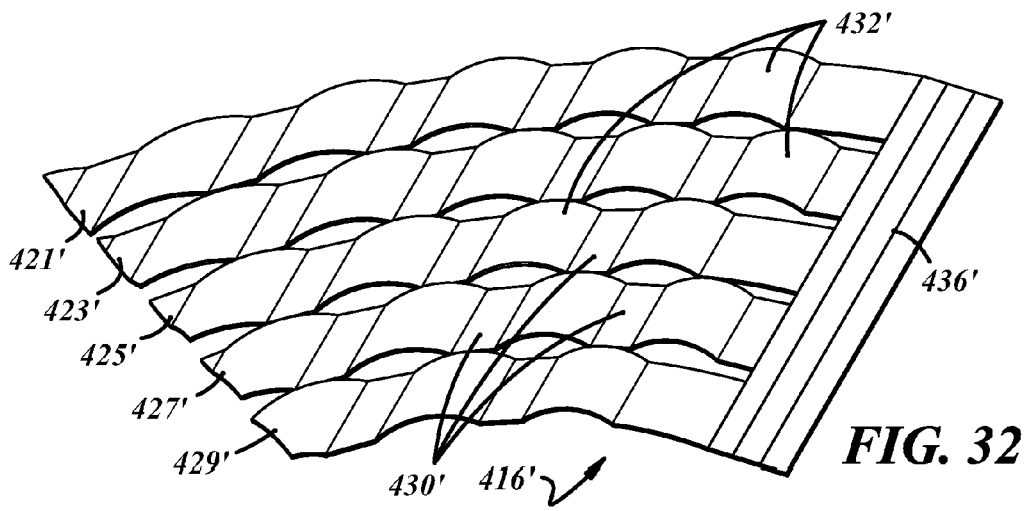
FIG. 32 shows an embodiment of a bump foil pad for promoting development of a turbulent boundary layer on the top foil during operation.

In another embodiment, an alternative bump foil geometry 416' may be used, as shown in FIG. 32, in which each of the series of the flats 430' and ridges 432' in each of the tabs 421', 423', 425', 427', 429' is offset from the flats and ridges of its neighbor. Under the applied pressure generated during use, such as shown in FIG. 16, those portions of the top foil overlying the flats may be displaced downward more than the surrounding regions overlying the ridges to form a dimpled surface on the top foil. Since this dimpled surface may develop due to the positional variation in stiffness of the top foil-bump foil combination, it may develop in the absence of top foil wear and similarly promote boundary layer transition from laminar to turbulent.

In FIG. 32, the ridges and flats on adjacent tabs are shown as 180° out of phase. However, lesser degrees of phase mismatch may be employed. Obviously, the dimple pattern will be modified in the event that other than 180° phase mismatch is selected, but, as described above, even at 0 degrees phase mis-match, the desired dimpling may develop due to wear.

A similar concept may be employed for journal bearings. In one embodiment, a journal bearing may have fewer than 9 ridges per tab. If, for a specific bearing and ridge spacing, the number of ridges would exceed nine, then multiple bump foils, each with fewer than 9 ridges, in sufficient number to fully cover the bearing surface, may be employed. Preferably, the ridges may be oriented perpendicular to the axis of shaft rotation, but ridges inclined at up to ±45° to the shaft rotation axis will yield acceptable results.

In FIG. 30, foil thrust bearing 500 comprising thrust plate 506 with through holes 502 and 504 for attachment or alignment may have through holes 508 for ingress of cooling air to a plurality of bearing pads 510 comprising top foil pads 512 and bump foil pads 514. In this embodiment, top foil pads 512 and bump foil pads 514 may be attached to thrust plate 506 only along line 520, and edges 521, 522, and 523 of top foil pad 512 may be unattached. A similar procedure may be adopted for bump foil pad 514. The attachment of the bump foil is not shown in FIG. 30, but bump foil pad 414 shown in FIG. 26 or bump foil pad 416' shown in FIG. 32 may be adapted for such procedure where flats 436 (FIG. 26) or 436' (FIG. 32) may be employed to weld the bump foil pad to thrust plate 506 (FIG. 30).

Figure 31:
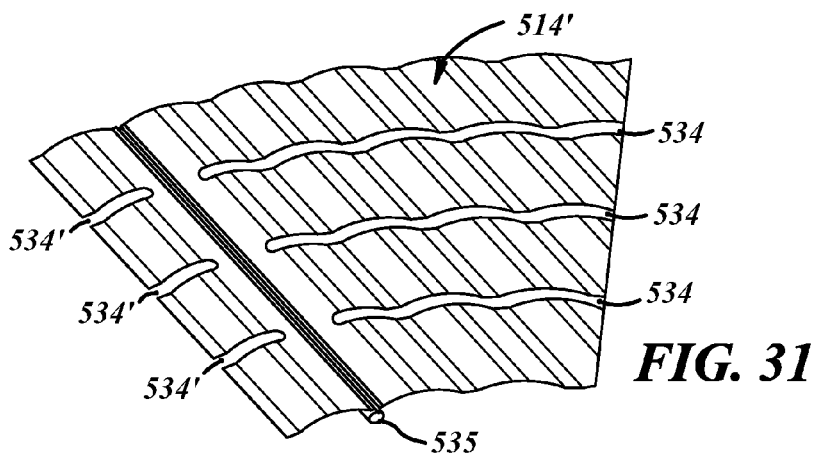
FIG. 31 shows an embodiment of a bump foil pad adapted for mechanical attachment to a thrust plate.

In addition to the configurations and procedures identified for attachment of the bump foil pad to the thrust plate, the trapezoidal-shaped (or shaped like the Greek capital letter omega) retaining groove employed to retain the foil in the journal bearing may be adapted to attach the bump foil pad to the thrust plate. An example of such a bump foil pad is shown as 514' in FIG. 31. The Greek capital letter omega-shaped retaining feature 535 is evident, and only minor changes to the slit configuration, here shown as two sets of circumferential slits 534 and 534', are necessary to accommodate this attachment means.

It has been noted that foil bearings, either journal or thrust, may only generate their own supporting air film only after the shaft surface has attained some suitable and subsequent rotation speed. Hence, prior to exceeding that suitable speed on start up or subsequent to falling below that speed on shutdown, the shaft and top foil may be in loaded contact. Thus, wear of both the shaft and top foil may occur. The occurrence of wear may be reduced by appropriately coating the surfaces of the shaft and at least the shaft-contacting surface of the top foil. It has been found that an effective combination may be a hard, wear-resistant, coating applied to the shaft and a soft, lubricious coating applied to the top foil. It has also been found beneficial to retain the wear debris, mainly contributed by the softer lubricious coating, within the foil bearing, since, even though detached from the surface, they continue to contribute lubricity to the foil surface. Debris retention may be well promoted by the top foil geometry which leads to the 'elasto-pressure' dam shown at 209 in FIG. 12, which may be promoted by the top foil-bump foil configurations herein described.

The above description of select examples of embodiments of the invention is merely illustrative in nature, and, thus, variations or variants thereof are not to be regarded as a departure from the spirit and scope of the invention.

What is claimed is:

1. A foil journal bearing comprising:
   a hollow housing having an elongate generally cylindrical inner surface;
   a single foil which engages said inner surface and which is mounted to said housing;
   said single foil extending longitudinally of said inner surface and extending circumferentially of said inner surface and having a generally flat top foil portion and having a bump foil Portion which is disposed between said top foil portion and said inner surface of said housing; and
   said bump foil portion comprising a plurality of circumferentially spaced ridges which engage said top foil portion and further comprising a plurality of generally flat portions between said ridges respectively and which engage said inner surface of said housing, wherein said bump foil portion has a plurality of regions, wherein each of said regions has a plurality of ridges separated by flat portions, and wherein said regions are separated by extended flat portions such that the spacing between each adjacent pair of said regions is substantially greater than the spacing between each adjacent pair of said ridges in said regions.

2. The foil journal bearing of claim 1, wherein said single foil has a portion which is mounted to said housing, said mounted portion dividing said single foil into said bump foil portion and said top foil portion.

3. The foil journal bearing of claim 1, wherein said single foil has a portion which is mounted to said housing, said mounted portion being located at an end of said single foil.

4. The foil journal bearing of claim 1, wherein said ridges are of generally uniform height.

5. The foil journal bearing of claim 1, wherein said bump foil portion comprises a series of strips, separated by slots, each strip and slot being oriented perpendicular to the cylindrical axis, and each strip having a plurality of groups of ridges and flats oriented generally parallel to the cylindrical axis wherein the ridges on a first strip are aligned with the flats on its adjacent strips.

6. The foil journal bearing as set forth in claim 1, wherein said housing has a longitudinal opening therein which extends over the length of said housing and wherein said single foil has a feature which is shaped to be complementary to said opening and which is mounted in said opening thereby mounting said single foil to said housing.

7. The foil journal bearing as set forth in claim 1, wherein said bearing housing is split along a plane containing the cylindrical axis of the housing.

8. The foil journal bearing as set forth in claim 1, wherein each of said bump foil portion and said top foil portion extends circumferentially over substantially the entirety of said inner surface.

9. A foil journal bearing comprising:
a hollow housing having an elongate generally cylindrical inner surface;
a single foil which engages said inner surface and which has a portion which is mounted to said housing;
said single foil extending longitudinally of said inner surface and having a generally flat top foil portion which extends from said mounted portion in one direction circumferentially of said inner surface and having a bump foil Portion which extends from said mounted portion in the other direction circumferentially of said inner surface; and
wherein said bump foil portion is disposed between said top foil portion and said inner surface of said housing, wherein said bump foil portion comprises a plurality of circumferentially spaced ridges which engage said top foil portion and further comprising a plurality of generally flat portions between said ridges respectively and which engage said inner surface of said housing, wherein said bump foil portion has a plurality of regions, wherein each of said regions has a plurality of said ridges separated by said flat portions, and wherein said regions are separated by extended flat portions such that the spacing between each adjacent pair of said regions is substantially greater than the spacing between each adjacent pair of said ridges in said regions.

10. The foil journal bearing of claim 9, wherein said bump foil portion comprises a series of strips, separated by slots, each strip and slot being oriented perpendicular to the cylindrical axis, and each strip having a plurality of groups of ridges and flats oriented generally parallel to the cylindrical axis wherein the ridges on a first strip are aligned with the flats on its adjacent strips.

11. The foil journal bearing as set forth in claim 9, wherein said bearing housing is split along a plane containing the cylindrical axis of the housing.

12. The foil journal bearing as set forth in claim 9, wherein each of said bump foil portion and said top foil portion extends circumferentially over substantially the entirety of said inner surface.

13. A foil journal bearing comprising:
a hollow housing having an elongate generally cylindrical inner surface;
a single foil which engages said inner surface and extends longitudinally of said inner surface and which has a portion which is mounted to said housing;
said single foil having a bump foil portion which extends circumferentially from said mounted portion substantially entirely about said inner surface to an end and further has a generally flat top foil portion which extends from said end of said bump foil portion substantially entirely about said inner surface;
wherein said bump foil portion is disposed between said top foil portion and said inner surface of said housing,
wherein said bump foil portion comprises a plurality of circumferentially spaced ridges which engage said top foil portion and further comprising a plurality of generally flat portions between said ridges respectively and which engage said inner surface of said housing,
wherein said bump foil portion has a plurality of regions, wherein each of said regions has a plurality of said ridges separated by said flat portions, and wherein said regions are separated by extended flat portions such that the spacing between each adjacent pair of said regions is substantially greater than the spacing between each adjacent pair of said ridges in said regions.

14. The foil journal bearing of claim 13, wherein said bump foil portion comprises a series of strips, separated by slots, each strip and slot being oriented perpendicular to the cylindrical axis, and each strip having a plurality of groups of ridges and flats oriented generally parallel to the cylindrical axis wherein the ridges on a first strip are aligned with the flats on its adjacent strips.

15. The foil journal bearing as set forth in claim 13, wherein said bearing housing is split along a plane containing the cylindrical axis of the housing.

* * * * *